United States Patent
Murakami et al.

(10) Patent No.: US 6,711,102 B1
(45) Date of Patent: Mar. 23, 2004

(54) MAGNETO-OPTICAL CLEANING DISK

(75) Inventors: Yutaka Murakami, Hirakata (JP);
Osamu Mizuno, Osaka (JP); Hideki Nakata, Souraku-gun (JP); Tohru Nakamura, Katano (JP)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 182 days.

(21) Appl. No.: 09/889,017

(22) PCT Filed: Nov. 20, 2000

(86) PCT No.: PCT/JP00/08190
§ 371 (c)(1),
(2), (4) Date: Jul. 10, 2001

(87) PCT Pub. No.: WO01/39182
PCT Pub. Date: May 31, 2001

(30) Foreign Application Priority Data

Nov. 25, 1999 (JP) ............................................ 11/334377
Jun. 26, 2000 (JP) ........................................ 2000/190894

(51) Int. Cl.[7] ............................................. G11B 11/00
(52) U.S. Cl. ...................................... 369/13.36; 369/72
(58) Field of Search ........................... 369/13.36, 13.35, 369/13.02, 13.38, 72, 71, 75.2, 75.1, 77.2, 77.1; 360/128

(56) References Cited

U.S. PATENT DOCUMENTS

| | | | |
|---|---|---|---|
| 4,734,815 A | * 3/1988 | Naganawa et al. | 360/133 |
| 5,467,238 A | * 11/1995 | Lee et al. | 360/128 |
| 5,966,360 A | * 10/1999 | Miyazaki et al. | 369/71 |
| 6,324,158 B1 | * 11/2001 | Nakatsu et al. | 369/291 |
| 6,577,575 B2 | * 6/2003 | Novotny et al. | 369/71 |

FOREIGN PATENT DOCUMENTS

| | | | | |
|---|---|---|---|---|
| JP | 5-151747 a | * | 6/1993 | ............. 369/72 |
| JP | 6-274957 A | * | 9/1994 | ............. 369/72 |
| JP | 7-6430 A | * | 1/1995 | ............. 369/72 |
| JP | 07006431 | | 1/1995 | |
| JP | 08167125 | | 6/1996 | |
| JP | 09128721 | | 5/1997 | |
| JP | 09147437 | | 6/1997 | |
| JP | 9-245390 A | * | 9/1997 | ............. 369/72 |
| JP | 10-91926 A | * | 4/1998 | ............. 369/72 |
| JP | 11045417 | | 2/1999 | |
| JP | 11176035 | | 7/1999 | |
| JP | 11185420 | | 7/1999 | |
| JP | 11-328764 A | * | 11/1999 | ............. 369/72 |
| JP | 200011338 | | 1/2000 | |
| JP | 200011339 | | 1/2000 | |
| JP | 2000-173029 A | * | 6/2000 | ............. 369/72 |

* cited by examiner

Primary Examiner—Tan Dinh
(74) Attorney, Agent, or Firm—Stevens, Davis, Miller & Mosher, L.L.P.

(57) ABSTRACT

The present invention provides a cleaning disk and a magneto-optical disk drive apparatus being simple in structure, adaptable to cleaning disks having various specifications, low in power consumption, low in electromagnetic noise, and preventing damage to the magnetic head and the optical head; the cleaning disk comprises a magneto-optical disk having an information layer, and a head-cleaning member, provided on the magneto-optical disk, for cleaning the magnetic head of the magneto-optical disk drive apparatus, wherein information regarding a magnetic head cleaning condition for setting the operation condition of the magneto-optical disk drive apparatus during cleaning of the magnetic head has been recorded in advance on the information layer of the magneto-optical disk. The magneto-optical disk drive apparatus reads the information regarding the magnetic head cleaning condition so as to set the operation condition properly.

12 Claims, 18 Drawing Sheets

F I G. 1
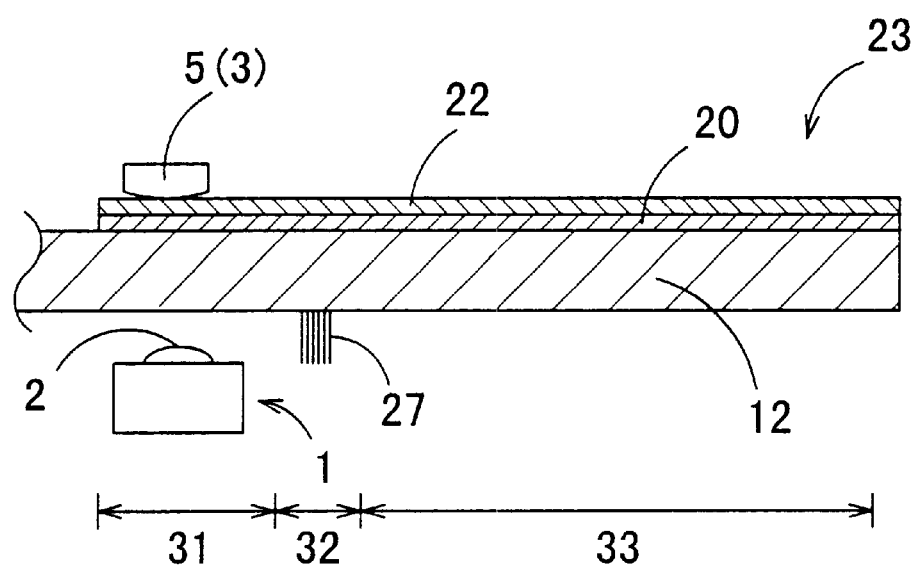

MAGNETO-OPTICAL CLEANING DISK

TECHNICAL FIELD

The present invention relates to a cleaning disk and a magneto-optical disk drive apparatus for removing dirt, dust and other foreign particles stuck to the magnetic head and optical head of an information recording/reproduction apparatus.

Furthermore, the present invention relates to a recording/reproduction apparatus, such as a floppy disk drive (hereafter simply referred to as an FDD), a minidisk apparatus (hereafter simply referred to as an MD apparatus) and a magneto-optical data file apparatus, provided with a sliding contact type magnetic head to apply a modulated magnetic field to a recording medium. More particularly, the present invention relates to a recording/reproduction apparatus capable of carrying out recording and reproduction on both types of disk media, that is, a magnetic head cleaning disk having a cleaning layer on its face making sliding contact with the magnetic head and an ordinary recording/reproduction disk.

BACKGROUND ART

First, the background art of the cleaning disk and the magneto-optical disk drive apparatus will be described.

Optical disk drive apparatuses are available as an optical disk drive apparatus based on a thermal change system wherein the crystals of the recording layer of an optical disk are changed in phases by the heat of the laser light of an optical head to carry out recording, typified by a CD-R and a DVD, and a magneto-optical disk drive apparatus based on a magneto-optical system wherein the heat by the laser light of an optical head is combined with the modulated magnetic field by a magnetic head to carry out recording, typified by an MD.

The prior art will be described below by taking a cleaning disk and a magneto-optical disk drive apparatus based on the magneto-optical system as examples.

In a conventional magneto-optical disk drive apparatus, an optical head for emitting a light beam applied to a magneto-optical recording layer is disposed on one side of a magneto-optical disk rotated by a disk rotation mechanism (spindle motor), and a magnetic head for applying an external magnetic field to the magneto-optical recording layer is disposed on the other side so as to be disposed opposite to the optical head.

The magneto-optical disk drive apparatus applies a modulated magnetic field, the direction of which is modulated depending on an information signal to be recorded from the magnetic head, to the magneto-optical recording layer of the magneto-optical disk to be rotated, and gathers the light beam emitted from the optical head and applies the light beam. After a portion heated to Curie temperature or more by this application of the light beam so as to be demagnetized is magnetized depending on the direction of the magnetic field applied from the magnetic head, the portion is cooled to Curie temperature or less by the relative movement of the light beam owing to the rotation of the magneto-optical disk, and the direction of the magnetization is fixed, whereby the information signal is recorded.

In this magneto-optical disk apparatus, when dust and the like are stuck to the surfaces of the objective lens of the optical head and the magnetic head relating to the recording and reproduction of signals, the dust and the like may prevent the laser light from reaching the magneto-optical recording layer of the magneto-optical disk, and may be stuck to the surface of the disk, thereby increasing wear of the magneto-optical disk and making scratches, furthermore, disturbing the spacing between the magnetic head and the magneto-optical disk and increasing errors owing to the disturbance.

A cleaning disk is used conventionally to remove stain owing to dust and the like on the surfaces of the objective lens and the magnetic head. An example of the disk is disclosed in Japanese Laid-open Patent Application Hei 7-6430. This disk is shown in FIG. 20. FIG. 20 is an exploded perspective view showing the conventional cleaning disk.

In the figure, a conventional disk 100 is used for an MD apparatus, and just as in the case of a general writable minidisk, lens-cleaning members 27 having the shape of a raised brush fur bundle are disposed on the surface of a magneto-optical disk 104 provided with a clamping hub 19 at its center, and a head-cleaning member 22 having a nearly sheet-like shape and capable of being made contact with the end of the magnetic head at the recording position is bonded in a predetermined radial range on the surface of the disk disposed opposite to the magnetic head.

The cleaning disk 100 is rotatably housed in the cartridge 6 comprising an upper cartridge 26 and a lower cartridge 28. The upper cartridge 26 is secured to the lower cartridge 28 with screws 9. A disk detection groove 29 is formed in a part of the cartridge 6, whereby the magneto-optical disk drive apparatus can detect that the cleaning disk 100 is a recordable disk, just like the magneto-optical disk for ordinary recording. This cartridge 6 has a configuration common to the cartridge of the magneto-optical disk for ordinary recording.

When the conventional cleaning disk 100 based on the above-mentioned configuration is loaded into the magneto-optical disk drive apparatus, the magneto-optical disk drive apparatus determines that the disk is a recording disk by using a disk detection switch and carries out recording operation. At this time, the lens-cleaning members 27 make contact with the objective lens of the optical head, and the head-cleaning member on the opposite side makes contact with the magnetic head, thereby cleaning the objective lens and the magnetic head in accordance with the rotation of the magneto-optical disk 104. After a predetermined time, stop operation is carried out, and the cleaning disk is taken out of the magneto-optical disk drive apparatus, thereby completing cleaning.

If the magnetic head keeps sliding at the same area of the above-mentioned head-cleaning member, the head-cleaning member may be worn out, and dust and the like removed from the sliding face of the magnetic head by the head-cleaning member may be stuck again to the sliding face at the end of the magnetic head.

Hence, when the magnetic head is cleaned by using the cleaning disk in the case of an MD apparatus for example, it is supposed that ordinary recording operation is carried out during cleaning, and that the portion used for recording, i.e., the portion used for cleaning, is recorded as a first piece of music after the cleaning. Therefore, when the cleaning disk is used next, the cleaning of the magnetic head starts at the position for a second piece of music. This configuration therefore prevents the magnetic head from sliding at the same portion of the above-mentioned cleaning member.

In the magneto-optical disk for ordinary recording (ordinary recording/reproduction disk), a lubrication film of about 10 µm to 20 µm is formed on the magneto-optical recording layer. The spacing between the magnetic core of the magnetic head and the above-mentioned magneto-optical recording layer is about 0.01 mm to 0.1 mm.

On the other hand, in the magnetic head cleaning disk, a head-cleaning member of 0.2 mm to 0.4 mm in thickness is present on the magneto-optical recording film. Hence, the spacing between the magnetic core and the magneto-optical recording film is two times or more that of the ordinary magneto-optical disk.

In addition, in the magneto-optical disk drive apparatus, in order that the ordinary recording magneto-optical disk and the cleaning disk can be used without discrimination therebetween, a modulated current to be supplied to the magnetic head is set larger so that recording on the cleaning disk can be carried out without problems, whereby the magnetic head is driven by the same current value as that used during recording on the cleaning disk, even during recording on the ordinary recording magneto-optical disk.

In recent years, reducing the magnetic head drive current has become a problem in order to extend battery life in portable apparatuses, typified by a portable MD apparatus for example, and to reduce electromagnetic noise at the time when the magnetic head is driven.

However, in the above-mentioned conventional cleaning disk and magneto-optical disk drive apparatus, it is necessary to guarantee recording on the cleaning disk, although the usage frequency of the cleaning disk having the large spacing between the magnetic head and the magneto-optical recording layer is less than that of the ordinary magneto-optical disk. For this reason, the modulated current of the magnetic head, that is, the drive current of the magnetic head, cannot be reduced, thereby causing a problem of making electric power saving difficult.

Furthermore, the rotation speed of the disk tends to increase as the speed of information transfer increases; in the above-mentioned conventional recording/reproduction apparatus, when the cleaning disk is used, the sliding face of the magnetic head may wear out and the objective lens actuator of the optical head may break because of high rotation speed, resulting in problems. To solve the above-mentioned problems, the necessity for identifying cleaning disk is intensified.

In a magneto-optical disk provided with a cartridge, it is proposed that a type indication portion for identifying the type of disk is provided by forming a notch in a part of the cartridge as disclosed in Japanese Laid-open Patent Application Hei 5-135541, for example.

However, a special-purpose detection switch is required for the magneto-optical disk drive apparatus; this increases the number of components for the magneto-optical disk drive apparatus and makes the structure more complicated; furthermore, when it is necessary to increase the modulated current value of the magnetic head required for recording because the specifications of the cleaning disk, such as the thickness of the head-cleaning member, are changed, no countermeasure can be taken, result in a problem.

Next, the background art of the recording/reproduction apparatus will be described.

As a recording/reproduction apparatus provided with a magnetic head, a recording/reproduction apparatus based on a magnetic recording/reproduction system, typified by an FDD, wherein information is recorded/reproduced on a disk medium by the magnetic head, is available. In addition, a recording/reproduction apparatus based on a magneto-optical recording/reproduction system, typified by an MD, wherein information is recorded/reproduced on a disk medium by the combination of the magnetic head and the optical head, is also available.

The conventional art will be described below by taking the recording/reproduction apparatus based on the magneto-optical recording/reproduction system as an example.

In the conventional recording/reproduction apparatus, an optical head for emitting a light beam applied to a magneto-optical recording layer is disposed on one side of a magneto-optical disk rotated by a disk rotation mechanism (spindle motor), and a magnetic head for applying an external magnetic field to the magneto-optical recording layer is disposed on the other side so as to be disposed opposite to the optical head.

The recording/reproduction apparatus applies a modulated magnetic field, the direction of which is modulated depending on an information signal to be recorded from the magnetic head, to the magneto-optical recording layer of the rotated magneto-optical disk, and gathers the light beam emitted from the optical head and applies the light beam.

After a portion heated to Curie temperature or more by this application of the light beam so as to be demagnetized is magnetized depending on the direction of the magnetic field applied from the magnetic head, the portion is cooled to Curie temperature or less by the relative movement of the light beam owing to the rotation of the magneto-optical disk, and the direction of the magnetization is fixed, whereby the information signal is recorded.

Since the magneto-optical disk may wobble when rotated, a recording/reproduction apparatus provided with a sliding contact type magnetic head for recording information signals with the head body of the magnetic head making contact with the disk is used for an MD for example.

In this recording/reproduction apparatus provided with the sliding contact type magnetic head, dust and the like deposited on the magneto-optical disk may be stuck to the head sliding face of the magnetic head making sliding contact with the magneto-optical disk during recording operation; owing to the use for a long time, dust is deposited on the head sliding face.

When this operation is repeated, stain owing to dust and the like on the sliding face of the magnetic head may increase wear of the magnetic head and the magneto-optical disk and make scratches, furthermore, disturb the spacing between the magnetic head and the magneto-optical disk and increase errors owing to the disturbance.

In order to remove such stain owing to dust and the like from the sliding face of the magnetic head, a cleaning disk for cleaning the magnetic head, wherein a cleaning layer formed of nonwoven cloth or the like is bonded to the face of a magneto-optical disk making sliding contact with the magnetic head, has been proposed so far (Japanese Laid-open Patent Application Hei 6-274957).

When the above-mentioned cleaning disk is used for a recording/reproduction apparatus, if the magnetic head keeps sliding at the same area of the cleaning layer of the above-mentioned cleaning disk, the cleaning layer may wear out, and dust and the like removed from the sliding face of the magnetic head by the cleaning layer may be stuck again to the sliding face of the magnetic head.

Hence, even when the cleaning disk is used in the case of an MD apparatus for example, it is supposed that the ordinary recording operation is carried out during cleaning, and that the portion used for recording, i.e., the portion used for cleaning, is recorded as a first piece of music after the cleaning. Therefore, when the cleaning disk is used next, the cleaning of the magnetic head starts at the position of a second piece of music; this configuration prevents the magnetic head from sliding at the same portion of the above-mentioned cleaning layer.

In the magneto-optical disk for ordinary recording (ordinary recording/reproduction disk), a lubrication film of about 10 μm to 20 μm is formed on the magneto-optical recording layer. The spacing between the magnetic core of the magnetic head and the above-mentioned magneto-optical recording film is about 0.01 mm to 0.1 mm.

On the other hand, in the cleaning disk, a head cleaning layer of 0.2 mm to 0.4 mm in thickness is present on the magneto-optical recording film. Hence, the spacing between the magnetic core and the magneto-optical recording film is two times or more that of the ordinary magneto-optical disk.

In addition, in order that the ordinary magneto-optical disk and the cleaning disk can be used without discrimination therebetween, a modulated current to be supplied to the magnetic head is set larger so that recording on the cleaning disk can be carried out without problems, whereby the magnetic head is driven by the same current value as that used during recording on the cleaning disk, even during recording on the ordinary magneto-optical disk.

In recent years, reducing the magnetic head modulated current has become a problem in order to extend battery life in portable apparatuses, typified by a portable MD apparatus for example, and to reduce electromagnetic noise when the magnetic head is driven.

However, in the above-mentioned conventional recording/reproduction apparatus, recording on the cleaning disk is required to be guaranteed, although the usage frequency of the cleaning disk having the large spacing between the magnetic head and the magneto-optical recording layer is extremely less than that of the ordinary magneto-optical disk; therefore, the modulated current cannot be reduced, thereby causing a problem of making electric power saving difficult.

Furthermore, the rotation speed of the disk tends to increase as the speed of information transfer increases; in the above-mentioned conventional recording/reproduction apparatus, when the cleaning disk is used, the sliding face of the magnetic head may wear out because of high rotation speed, resulting in problems.

DISCLOSURE OF THE INVENTION

An object of the present invention is to provide a cleaning disk and a magneto-optical disk drive apparatus being simple in structure, adaptable to cleaning disks having various specifications, low in power consumption, low in electromagnetic noise, and preventing damage to the magnetic head and the optical head.

Furthermore, another object of the present invention is to provide a recording/reproduction apparatus being low in power consumption and low in electromagnetic noise.

Furthermore, still another object of the present invention is to provide a recording/reproduction apparatus capable of reducing wear on the sliding face of the magnetic head.

The cleaning disk in accordance with the present invention comprises a magneto-optical disk having an information layer, and a head-cleaning member, provided on the magneto-optical disk, for cleaning the magnetic head of a magneto-optical disk drive apparatus, wherein information regarding a magnetic head cleaning condition for setting the operation condition of the magneto-optical disk drive apparatus during cleaning of the magnetic head has been recorded in advance on the information layer of the magneto-optical disk.

The above-mentioned cleaning condition is for example a recording condition during cleaning of the magnetic head, more specifically, the magnetic head drive current (modulated current) during cleaning, the rotation speed of the magneto-optical disk during cleaning or the laser power of the optical head during cleaning. Furthermore, the above-mentioned cleaning condition has been recorded in the index area on the information layer of the magneto-optical disk for example.

With this configuration, information regarding the magnetic head cleaning condition in the case when the cleaning disk is used, for example, an appropriate value of the drive current (modulated current) of the magnetic head during cleaning, an appropriate value of the rotation speed of the magneto-optical disk during cleaning or an appropriate value of the laser power of the optical head during cleaning can be read by the optical head from the cleaning disk. As a result, the operation condition of the magneto-optical disk drive apparatus during cleaning can be set at an appropriate state depending on the cleaning disk. Furthermore, the information regarding the cleaning condition can be read without providing any special structure, whereby the structure of the magneto-optical disk drive apparatus does not become complicated. Moreover, since the information regarding the cleaning condition is read by the optical head, it is possible to discriminate between the cleaning disk and the ordinary magneto-optical disk without requiring any special configuration, whereby the structure of the magneto-optical disk drive apparatus does not become complicated for disk discrimination. Furthermore, even when the specifications of the cleaning disk are modified, a countermeasure can be taken by changing the cleaning condition to be recorded on the cleaning disk in accordance therewith; even in the magneto-optical disk drive apparatus, by setting the operation condition depending on the cleaning condition, the operation condition of the magneto-optical disk drive apparatus during cleaning can be set at an appropriate state depending on the cleaning disk at all times.

A magneto-optical disk drive apparatus in accordance with the present invention has a magnetic head and an optical head, wherein information regarding the cleaning condition is read from a cleaning disk comprising a magneto-optical disk and a magnetic head-cleaning member provided thereon, on the information layer of which the information regarding the magnetic head cleaning condition is recorded, and an operation condition (regarding/reproduction condition) during cleaning is controlled on the basis of the cleaning condition.

With this configuration, information regarding the magnetic head cleaning condition in the case when the cleaning disk is used, for example, an appropriate value of the drive current (modulated current) of the magnetic head during cleaning, an appropriate value of the rotation speed of the magneto-optical disk during cleaning or an appropriate value of the laser power of the optical head during cleaning can be read by the optical head from the cleaning disk. As a result, the operation condition of the magneto-optical disk drive apparatus during cleaning can be set at an appropriate state depending on the cleaning disk. Furthermore, the information regarding the cleaning condition can be read without providing any special structure, whereby the structure of the magneto-optical disk drive apparatus does not become complicated. Moreover, since the information regarding the cleaning condition is read by the optical head, it is possible to discriminate between the cleaning disk and the ordinary magneto-optical disk without requiring any special configuration, whereby the structure of the magneto-optical disk drive apparatus does not become complicated for disk discrimination. Furthermore, even when the specifications of the cleaning disk are modified, by setting the operation condition depending on the cleaning condition having been read, the operation condition of the magneto-optical disk drive apparatus during cleaning can be set at an appropriate state depending on the cleaning disk at all times.

A first example of the above-mentioned cleaning condition is the drive current of the magnetic head during cleaning, and an example of the operation condition is the drive current of the magnetic head corresponding to the cleaning condition; the drive current of the magnetic head during cleaning is made larger than that during ordinary recording.

With this configuration, when recording is carried out on the ordinary magneto-optical disk, the drive current (modulated current) to be supplied to the magnetic head is made smaller than that during recording on the cleaning disk, whereby the power consumption and electromagnetic noise of the magneto-optical disk drive apparatus can be reduced.

A second example of the above-mentioned cleaning condition is the rotation speed of the magneto-optical disk during cleaning, and an example of the operation condition is the rotation speed of the magneto-optical disk corresponding to the cleaning condition; the rotation speed of the magneto-optical disk during cleaning is made lower than that during ordinary recording or reproduction.

With this configuration, damage to the optical head and the magnetic head at the time when the cleaning disk is used can be reduced.

A third example of the above-mentioned cleaning condition is the laser power of the optical head during cleaning, and an example of the operation condition is the laser power of the optical head corresponding to the cleaning condition; the laser power of the optical head during cleaning is made lower than that during ordinary recording.

With this configuration, the power consumption of the magneto-optical disk drive apparatus at the time when the cleaning disk is used can be reduced.

Furthermore, in the above-mentioned magneto-optical disk drive apparatus, the laser power of the optical head may be used as the laser power for reproduction during cleaning, and cleaning may be carried out while the magnetic head is made sliding contact with the cleaning disk, and then information designating the area of the cleaning disk used during the cleaning may be recorded in the index area on the information layer of the cleaning disk.

With this configuration, the power consumption of the magneto-optical disk drive apparatus during cleaning can be reduced, and the usable remaining area and the number of usage times of the cleaning disk can be grasped from the information in the index area.

Furthermore, in the above-mentioned magneto-optical disk drive apparatus, disk formatting may be disabled during cleaning.

With this configuration, information regarding the usable remaining area and the number of usage times of the cleaning disk is prevented from being erased or changed by mistake.

Furthermore, in the above-mentioned magneto-optical disk drive apparatus, at least the rewriting or erasing of the information in the index area may be disabled during cleaning.

With this configuration, in the case when information regarding the usable remaining area and the number of usage times of the cleaning disk is described in the index area, the information regarding the usable remaining area and the number of usage times of the cleaning disk is prevented from being erased or changed by mistake.

A first recording/reproduction apparatus in accordance with the present invention comprising a magnetic head and capable of using a magnetic head cleaning disk having a cleaning layer on a face making sliding contact with the magnetic head as well as an ordinary recording/reproduction disk as a disk medium, further comprising discrimination means for discriminating and recognizing that the disk medium is the magnetic head cleaning disk, and magnetic head drive means for making the current supplied to the magnetic head when the disk medium is the magnetic head cleaning disk larger than the current supplied to the magnetic head when the disk medium is the ordinary magneto-optical disk on the basis of the discrimination result of the discrimination means.

With this configuration, the discrimination means for discriminating and recognizing the magnetic head cleaning disk having the cleaning layer on the face making sliding contact with the magnetic head is provided, and the modulated current of the magnetic head when the magnetic head cleaning disk is used is made larger than the modulated current when the ordinary recording/reproduction disk is used, whereby the modulated current supplied to the magnetic head at the time when recording is carried out on the ordinary recording/reproduction disk can be made smaller than that at the time when recording is carried out on the magnetic head cleaning disk, and the power consumption and electromagnetic noise of the recording/reproduction apparatus can be reduced.

A second recording/reproduction apparatus in accordance with the present invention comprising a magnetic head and capable of using a magnetic head cleaning disk having a cleaning layer on a face making sliding contact with the magnetic head as well as an ordinary recording/reproduction disk as a disk medium, further comprising discrimination means for discriminating and recognizing that the disk medium is the magnetic head cleaning disk, and disk medium drive means for making the rotation speed of the disk medium when the disk medium is the magnetic head cleaning disk lower than the rotation speed of the disk medium when the disk medium is the ordinary magneto-optical disk on the basis of the discrimination result of the discrimination means.

With this configuration, the disk rotation speed when the magnetic head cleaning disk is used is made lower than that when the ordinary magneto-optical disk is used, whereby wear of the sliding face of the magnetic head can be reduced, and the reliability of the recording/reproduction apparatus can be improved.

A third recording/reproduction apparatus in accordance with the present invention comprising a magnetic head and capable of using a magnetic head cleaning disk having a cleaning layer on a face making sliding contact with the magnetic head as well as an ordinary recording/reproduction disk as a disk medium, further comprising discrimination means for discriminating and recognizing that the disk medium is the magnetic head cleaning disk, magnetic head drive means for making the current supplied to the magnetic head when the disk medium is the magnetic head cleaning disk larger than the current supplied to the magnetic head when the disk medium is the ordinary magneto-optical disk on the basis of the discrimination result of the discrimination means, and disk medium drive means for making the rotation speed of the disk medium when the disk medium is the magnetic head cleaning disk lower than the rotation speed of the disk medium when the disk medium is the ordinary magneto-optical disk on the basis of the discrimination result of the discrimination means.

With this configuration, the modulated current of the magnetic head at the time when recording is carried out on the ordinary recording/reproduction disk is made smaller than that at the time when recording is carried out on the magnetic head cleaning disk, and the power consumption and electromagnetic noise of the recording/reproduction apparatus can be reduced. In addition, the disk rotation speed when the magnetic head cleaning disk is used is made lower than that when the ordinary magneto-optical disk is used, whereby wear of the sliding face of the magnetic head can be reduced, and the reliability of the recording/reproduction apparatus can be improved.

In the above-mentioned first, second or third recording/reproduction apparatus, the discrimination means discriminates and recognizes that the disk medium is the magnetic head cleaning disk by detecting, for example, the reflectivity or color of the face of the disk medium making sliding contact with the magnetic head.

Furthermore, in the above-mentioned first, second or third recording/reproduction apparatus, the discrimination means discriminates and recognizes that the disk medium is the magnetic head cleaning disk by detecting, for example, the sliding load of the magnetic head making sliding contact with the disk medium.

In particular, it is preferable that the drive current of the spindle motor for rotating the disk medium should be detected as the sliding load. With this configuration, it is possible to discriminate between the magnetic head cleaning disk and the ordinary recording/reproduction disk without adding any special-purpose sensor, whereby the price of the recording/reproduction apparatus can be lowered.

BRIEF DESCRIPTION OF THE DRAWINGS

FIG. 1 is a sectional view showing the major portions of a cleaning disk and a magneto-optical disk drive apparatus in accordance with a first embodiment of the present invention in a state of cleaning;

BEST MODE FOR CARRYING OUT THE INVENTION

Figure 2:
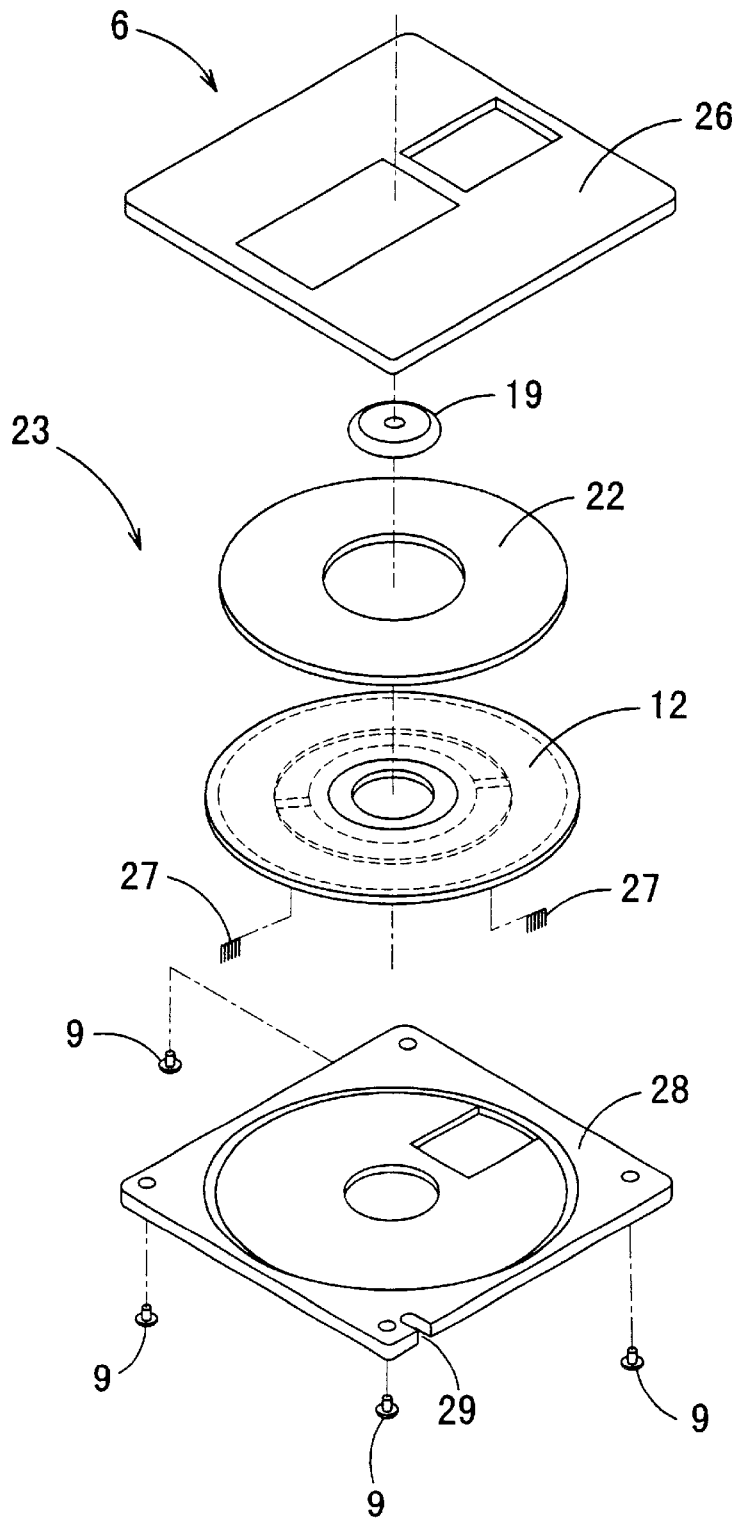
FIG. 2 is an exploded perspective view showing the cleaning disk in accordance with the first embodiment of the present invention.

Embodiments of the present invention will be described below referring to the drawings.
(First Embodiment)

Figure 3:
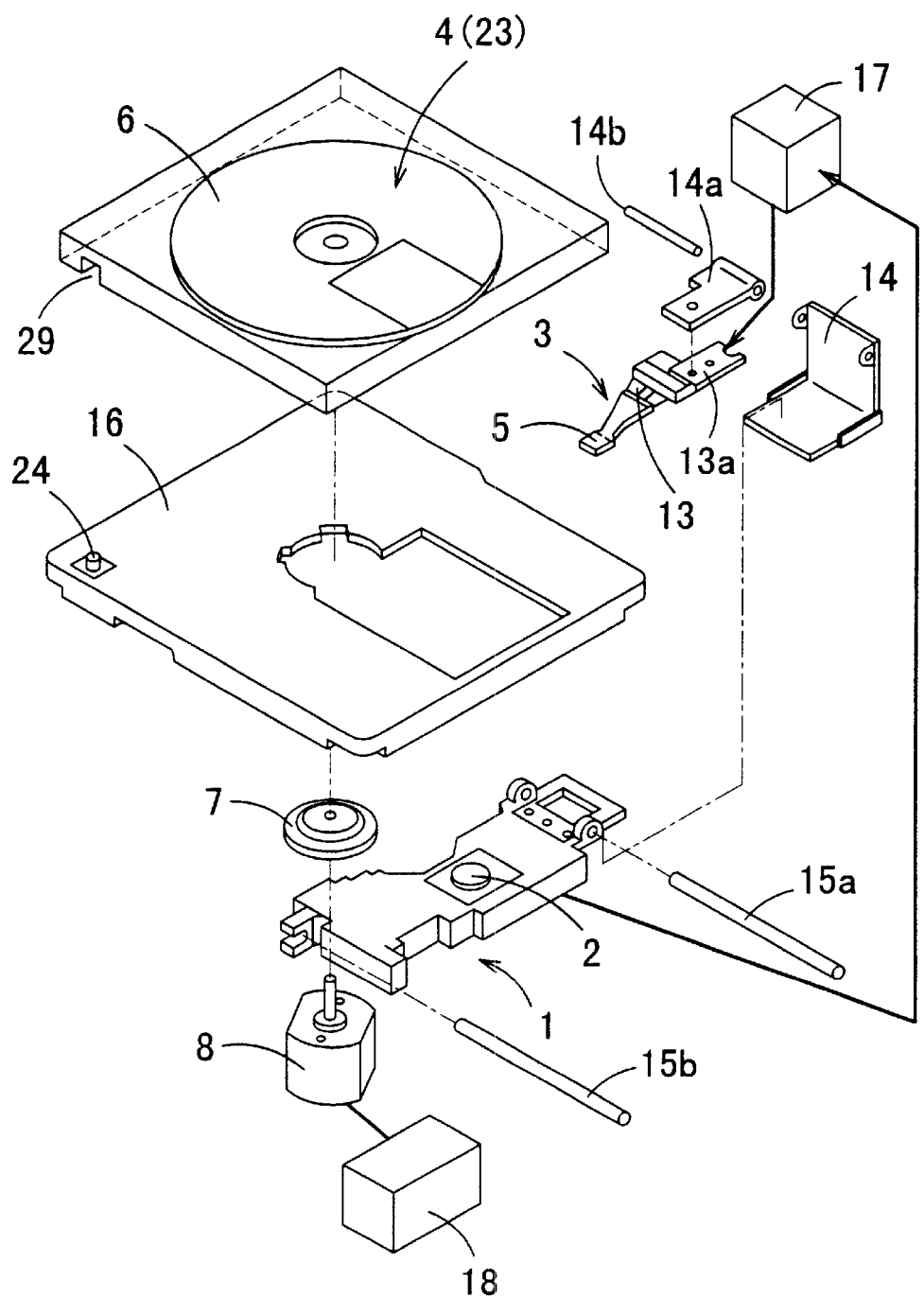
FIG. 3 is an exploded perspective view showing the cleaning disk and the magneto-optical disk drive apparatus in accordance with the first embodiment of the present invention.
Figure 4:
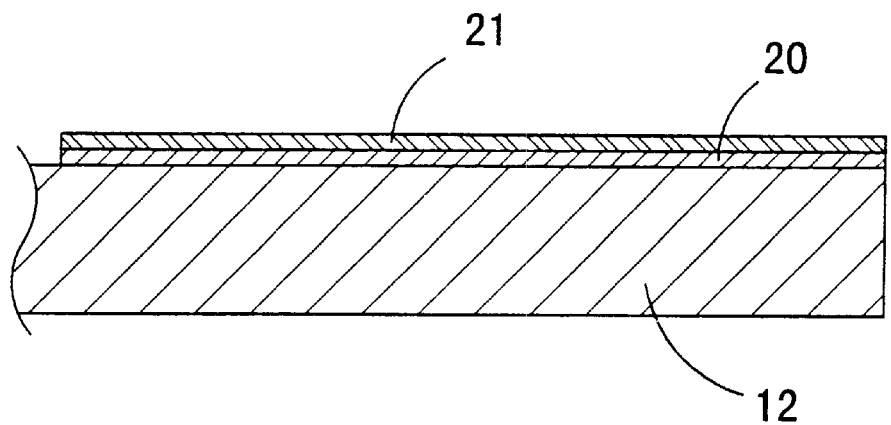
FIG. 4 is a sectional view showing the major portions of a magneto-optical disk for recording in accordance with the first embodiment of the present invention.
Figure 5:
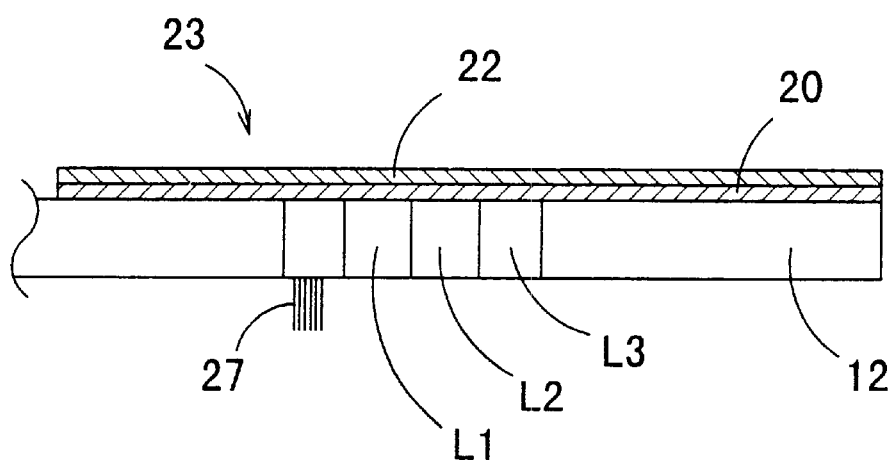
FIG. 5 is an explanatory view showing operation for recording on the cleaning disk in accordance with the first embodiment of the present invention.

FIG. 1 is a sectional view showing the major portions of a cleaning disk and a magneto-optical disk drive apparatus in accordance with a first embodiment of the present invention in a state of cleaning. FIG. 2 is an exploded perspective view showing the cleaning disk. FIG. 3 is an exploded perspective view showing the cleaning disk and the magneto-optical disk drive apparatus. FIG. 4 is a sectional view showing the major portions of a magneto-optical disk for ordinary recording. FIG. 5 is an explanatory view showing operation for recording on the cleaning disk.

In FIGS. 1 to 5, an optical head 1 is provided with an objective lens 2 for gathering and applying laser light to a magneto-optical disk 4 or a cleaning disk 23.

The objective lens 2 is driven by an objective lens drive apparatus (not shown), for example, on two axes by virtue of electromagnetic drive so that an optical spot follows surface wobbling and eccentricity of the magneto-optical disk 4 or the cleaning disk 23.

In a magnetic head 3, a magnetic head body 5 making sliding contact with the magneto-optical disk 4 and supplying a modulated magnetic field thereto is supported at one end of a suspension 13. The suspension 13 is made of a thin spring material, such as SUS304 or BeCu, to make the magnetic head body 5 sliding contact with the magneto-optical disk 4 or the cleaning disk 23 at all times even when surface wobbling occurs on the magneto-optical disk 4 or the cleaning disk 23. The other end of the suspension 13 is held by a fixed portion 13a, the fixed portion 13a is secured to a joint portion 14a, and the joint portion 14a is rotatably held by a connection portion 14 via a shaft 14b. Furthermore, the connection portion 14 is connected to the optical head 1.

The magnetic head body 5 has a slider portion made of a resin having a high sliding performance, such as polyphenylene sulfide or liquid crystal polymer, and makes sliding contact with the magneto-optical disk 4 or the cleaning disk 23. The magnetic head body 5 is provided with a magnetic circuit (not shown) comprising a magnetic core and a coil, and generates a modulated magnetic field when a modulated current is supplied from a magnetic head drive circuit 17.

Transfer shafts 15a and 15b are inserted into the optical head 1 and secured to a base 16. A spindle motor 8 is secured to the base 16. A turntable 7 is secured to the end of the rotation shaft of the spindle motor 8. The turntable 7 is provided with a permanent magnet for example and holds the magneto-optical disk 4 or the cleaning disk 23 by attracting a clamp hub made of a metal. Furthermore, a motor drive circuit 18 rotates and drives the spindle motor 8, thereby rotating the magneto-optical disk 4 or the cleaning disk 23. The magneto-optical disk 4 or the cleaning disk 23 is housed in a cartridge 6.

When the cartridge 6 is loaded into the magneto-optical disk drive apparatus, a shutter (not shown) provided for the cartridge 6 opens, and recording/reproduction operation by the optical head 1 and the magnetic head 3 can be carried out.

Next, the structure of the disk will be described. First, the magneto-optical disk 4 for recording/reproduction will be described referring to FIG. 4. A disk substrate 12 is made of a resin, such as polycarbonate. An information layer 20 is made of a magnetic film capable of vertical magnetization and formed on the disk substrate 12 by the sputtering method or the like. A lubrication film 21 is made of a silicone-based lubricant for example. The thickness of the lubrication film 21 is for example generally 10 μm to 20 μm in the case of an MD.

Next, the cleaning disk 23 will be described referring to FIG. 1. A disk substrate 12 is made of a resin, such as polycarbonate. An information layer 20 is made of a magnetic film capable of vertical magnetization and formed on the disk substrate 12 by the sputtering method or the like. A head-cleaning member 22 having the shape of a sheet is formed of woven cloth made of animal fiber, plant fiber, synthetic fiber, chemical fiber, etc. or nonwoven cloth. This head-cleaning member 22 is secured to the disk substrate 12 with an adhesive for example, and its thickness is for example about 0.2 mm to 0.4 mm in the case of an MD. Its coefficient of friction is about two to four times as high as that of the lubrication film 21.

Lens cleaning members 27 are made of nylon fiber, carbon fiber, glass fiber, amide fiber and the like, individually or in combination. The lens-cleaning members 27 are secured to the disk substrate 12 with an adhesive for example and formed so that their brush-shaped ends make contact with the objective lens 2.

A disk information area 31 used as an index area, a skip area 32 and a recording area 33 are formed on the information layer 20 from its inner circumference, and information (a current value) regarding a magnetic head drive current in the case of using the cleaning disk 23 is recorded beforehand in the disk information area 31.

This information regarding the magnetic head drive current is formed as microscopic pits and projections on the disk substrate 12 for example.

The cleaning disk 23 is rotatably housed in the cartridge 6 comprising an upper cartridge 26 and a lower cartridge 28. The cartridge 6 is provided with a disk detection groove 29; when the cartridge 6 is loaded into the magneto-optical disk drive apparatus, a disk detection switch 24 disposed on the base 16 turns "ON" and recognizes the disk as a recording disk.

Next, the operation of the above-mentioned magneto-optical disk drive apparatus will be described. When recording is carried out on the magneto-optical disk 4 or the cleaning disk 23 shown in FIGS. 1 to 5, while the above-mentioned magneto-optical disk 4 or cleaning disk 23 is rotated by the spindle motor 8, the optical head 1 emits a laser spot to one side of the information layer 20 to heat a recording area of the information layer 20 to Curie temperature or more. At the same time, a current modulated by an information signal is supplied from the magnetic head drive circuit 17 to the coil of the magnetic head body 5, whereby a vertical magnetic field being directed from the magnetic core to the information layer 20 is generated, and an N or S magnetic field is thus applied. As a result, recording is carried out.

At this time, the slider portion of the magnetic head body 5 makes sliding contact with the lubrication film 21 or the head-cleaning member 22.

One cleaning operation of the magnetic head 3 becomes one recording operation of about 10 to 30 seconds in the case of an MD for example. As shown in FIG. 5, each time a cleaning operation is carried out, the operation is recorded as a piece of music; when a cleaning operation is carried out next time, a recording operation is performed and recorded as the next piece of music. In other words, the slider portion of the magnetic head body 5 does not make sliding contact with an area on the head-cleaning member 22 again, with which the slider portion made sliding contact. This prevents dust and the like stuck to the cleaning layer from being stuck to the magnetic head body 5 again. In FIG. 5, L1 designates the recording area for the first piece of music, and L2 and L3 designate the recording areas for the second and third pieces of music, respectively.

In the above-mentioned magnetic cleaning operation, when the magnetic head cleaning disk 23 is loaded into the magneto-optical disk drive apparatus, the optical head 1 first reads the disk information area 31. In this disk information area 31, the magnitude of an appropriate modulated current to be supplied to the magnetic head 3 in the case when the cleaning disk 23 is used has been recorded in advance; according to the signal read by the optical head 1, information regarding the preset value of the modulated current is supplied to the magnetic head drive circuit 17, whereby the current supplied from the magnetic head drive circuit 17 to the magnetic head 3 is made larger than the current at the time when recording is carried out on the magneto-optical disk 4 (usually about 100 mA to 150 mA in the case of an MD). In other words, the modulated current is increased to the appropriate current value (usually about 250 mA to 400 mA in the case of an MD).

Then, the optical head 1 moves to a recording area 33 provided on the outer circumferential side of the skip area 32, and recording operation, that is, cleaning operation starts.

By the above-mentioned operation, dust stuck to the magnetic head body 5 is wiped off and removed by the head-cleaning member 22, and recording operation on the information layer 20 is carried out.

Furthermore, when the objective lens 2 is cleaned, the reproduction state of the magneto-optical disk drive apparatus is selected, whereby the optical head 1 moves to the skip area 32. Then, the lens-cleaning members 27 make rotating contact with the objective lens 2 to remove dust stuck to the objective lens 2.

As described above, in the cleaning disk and the magneto-optical disk drive apparatus in accordance with the first embodiment of the preset invention, the information regarding the magnetic head drive current is provided in the disk information area 31 of the cleaning disk 23, and the information in the disk information area 31 is read by the optical head 1, whereby the magnetic head drive current can be made large when recording operation is carried out on the cleaning disk 23, and the magnetic head drive current can be made small when recording operation is carried out on the magneto-optical disk 4, an ordinary medium.

Hence, in the case when the cleaning disk 23 is used, the optical head 1 can read the magnetic head modulated current without providing any new detection mechanism, and power consumption and electromagnetic noise of the magneto-optical disk drive apparatus can be reduced.

In addition, the appropriate value of the magnetic head drive current (modulated current) during cleaning can be read by the optical head 1 from the cleaning disk 23. As a result, the operation condition of the magneto-optical disk drive apparatus during cleaning can be set at an appropriate state depending on the cleaning disk 23. Furthermore, the appropriate value of the magnetic head drive current (modulated current) can be read without providing any special structure, whereby the structure of the magneto-optical disk drive apparatus does not become complicated. Moreover, since the appropriate value of the magnetic head drive current (modulated current) is read by the optical head 1, it is possible to discriminate between the cleaning disk 23 and the ordinary magneto-optical disk 4 without requiring any special configuration, whereby the structure of the magneto-optical disk drive apparatus does not become complicated for disk discrimination. Furthermore, even when the specifications of the cleaning disk 23 are modified, a countermeasure can be taken by changing the appropriate value of the magnetic head drive current (modulated current) to be recorded on the cleaning disk in accordance therewith; even in the magneto-optical disk drive apparatus, by setting the operation condition depending on the appropriate value of the magnetic head drive current (modulated current), the operation condition of the magneto-optical disk drive apparatus during cleaning can be set at an appropriate state depending on the cleaning disk 23 at all times.

(Second Embodiment)

Figure 6:
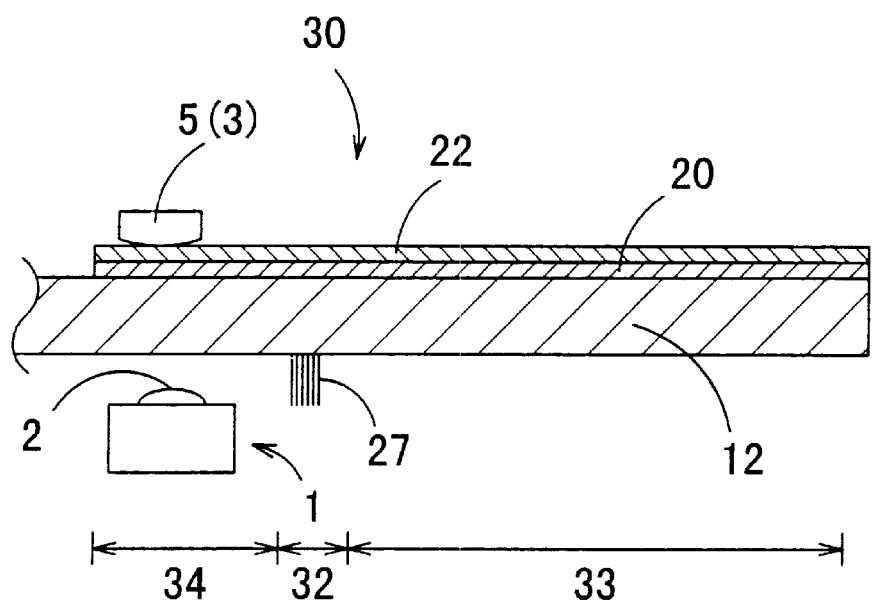
FIG. 6 is a sectional view showing the major portions of a cleaning disk and a magneto-optical disk drive apparatus in accordance with a second embodiment of the present invention in a state of cleaning.
Figure 7:
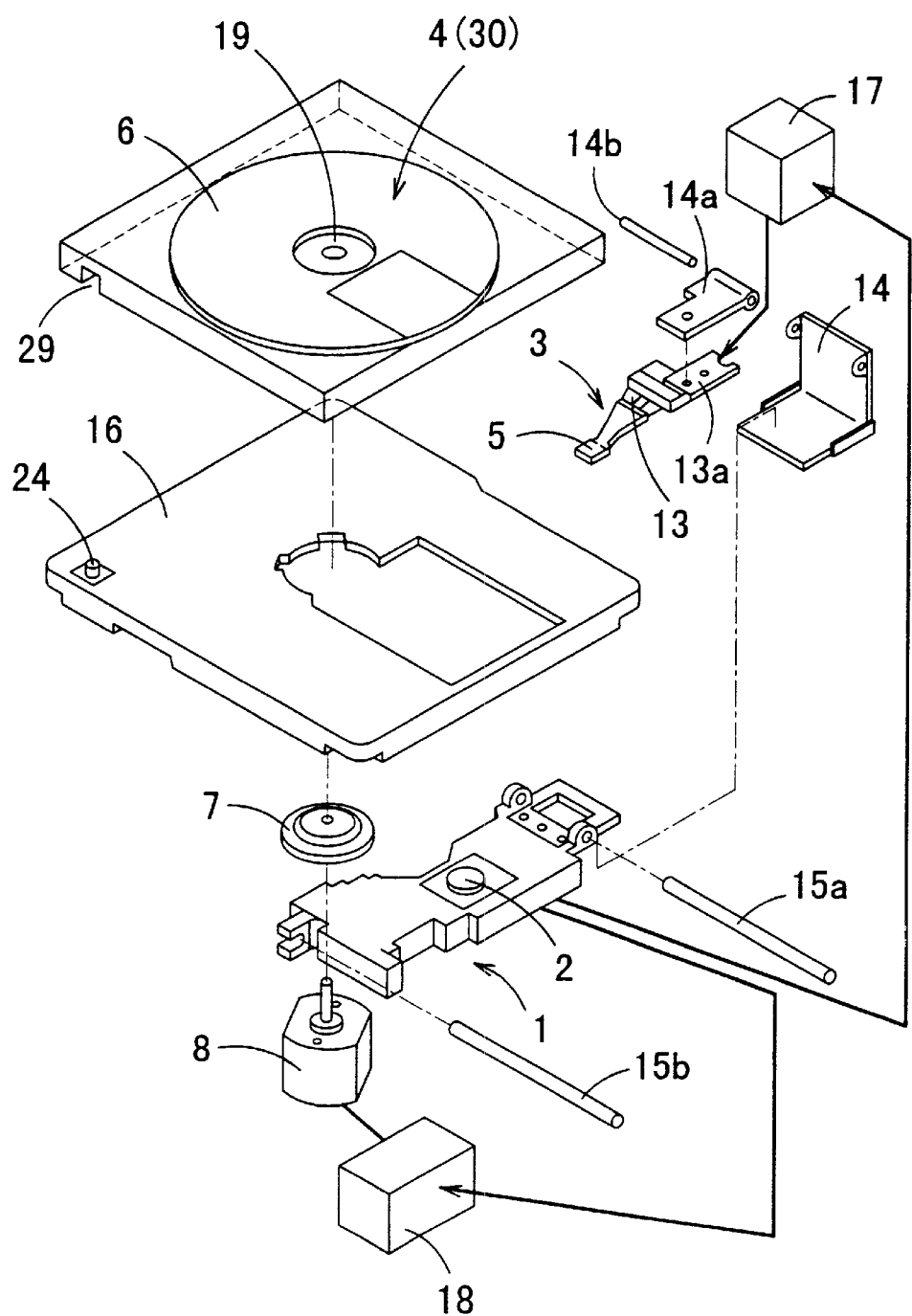
FIG. 7 is an exploded perspective view showing the cleaning disk and the magneto-optical disk drive apparatus in accordance with the second embodiment of the present invention.

FIG. 6 is a sectional view showing the major portions of a cleaning disk and a magneto-optical disk drive apparatus in accordance with a second embodiment of the present invention in a state of cleaning, and FIG. 7 is an exploded perspective view showing the cleaning disk and the magneto-optical disk drive apparatus.

Referring to FIGS. 6 and 7, this embodiment differs from the first embodiment in that information regarding magnetic head drive current (a current value) and information regarding disk rotation speed (a value representing rotation speed) at the time when the cleaning disk is used have been recorded in the disk information area 34 of a cleaning disk 30 in advance.

Next, operation will be described. In cleaning operation, when the cleaning disk 30 is loaded into the magneto-optical disk drive apparatus, the optical head 1 first reads the disk information area 34. In this disk information area 34, the information regarding the magnitude of a modulated current to be supplied to the magnetic head 3 and disk rotation speed in the case when the cleaning disk 30 is used has been recorded in advance; according to the signal read by the optical head 1, information regarding the preset value of the modulated current is supplied to the magnetic head drive circuit 17, and control information regarding the rotation speed of the cleaning disk 30 is sent to the motor drive circuit 18, whereby the current supplied from the magnetic head drive circuit 17 to the magnetic head 3 is made larger than the current in the case when recording operation is carried out on the magneto-optical disk 4, and the disk rotation speed is made lower (about ½ to ¹⁄₁₀ of the ordinary speed) than that in the case when the ordinary magneto-optical disk 4 is used. The value of the above-mentioned modulated current should only be set just as in the case of the previous embodiment.

Then, the optical head 1 moves to recording area 33 provided on the outer circumferential side of the skip area 32, and recording operation, that is, cleaning operation starts.

Since the details of the cleaning operation for the magnetic head 3 and the cleaning operation for the objective lens 2 are similar to those in the first embodiment, the explanations of them are omitted here.

As described above, in the cleaning disk and the magneto-optical disk drive apparatus in accordance with the second embodiment of the preset invention, the information regarding the magnetic head drive current and the information regarding the disk rotation speed are provided in the disk information area 34 of the cleaning disk 30, and the information in the disk information area 34 is read by the optical head 1, whereby the magnetic head drive current can be made large and the disk rotation speed can be made low when recording operation is carried out on the cleaning disk 30, and the magnetic head drive current can be made small and the disk rotation speed can be made high when recording operation is carried out on the magneto-optical disk 4 for ordinary recording/reproduction.

Hence, it is possible to prevent wear of the magnetic head, damage of the objective lens and deformation of the wire suspension for supporting the objective lens during cleaning operation; in addition to the effects of the first embodiment, the reliability of the devices is improved.

In addition, the rotation speed of the magneto-optical disk during cleaning can be read by the optical head 1. As a result, the operation condition of the magneto-optical disk drive apparatus during cleaning can be set at an appropriate state depending on the cleaning disk 30. Furthermore, the rotation speed of the magneto-optical disk during cleaning can be read without providing any special structure, whereby the structure of the magneto-optical disk drive apparatus does not become complicated. Moreover, since the rotation speed of the magneto-optical disk during cleaning is read by the optical head 1, it is thus possible to discriminate between the cleaning disk 30 and the ordinary magneto-optical disk 4 without requiring any special configuration, whereby the structure of the magneto-optical disk drive apparatus does not become complicated for disk discrimination. Furthermore, even when the specifications of the cleaning disk 30 are modified, a countermeasure can be taken by changing the appropriate value of the magnetic head drive current (modulated current) to be recorded on the cleaning disk 30 in accordance therewith; even in the magneto-optical disk drive apparatus, by setting the operation condition depending on the appropriate value of the magnetic head drive current (modulated current), the operation condition of the magneto-optical disk drive apparatus during cleaning can be set at an appropriate state depending on the cleaning disk 30 at all times.

(Third Embodiment)

Figure 8:
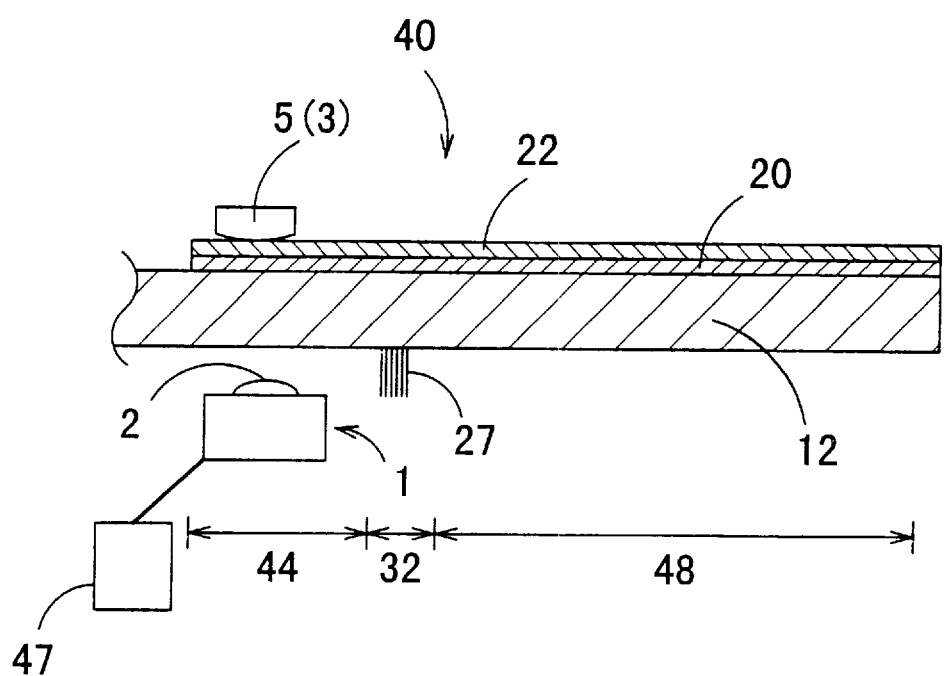
FIG. 8 is a sectional view showing the major portions of a cleaning disk and a magneto-optical disk drive apparatus in accordance with a third embodiment of the present invention in a state of cleaning.

FIG. 8 is a sectional view showing the major portions of a cleaning disk and a magneto-optical disk drive apparatus in accordance with a third embodiment of the present invention in a state of cleaning.

Referring to FIG. 8, this embodiment differs from the first and second embodiments in that, in the disk information area 44 of a cleaning disk 40, information (an output power value) regarding the laser power of the optical head 1 at the time when the cleaning disk is used has been recorded in advance.

Next, operation will be described. In cleaning operation, when the cleaning disk 40 is loaded into the magneto-optical disk drive apparatus, the optical head 1 first reads the disk information area 44. In this disk information area 44, the setting information of the power of laser emitted from the optical head 1 in the case when the cleaning disk 40 is used has been recorded in advance; the signal read by the optical head 1 is sent to an optical head drive circuit 47 as the setting information of the laser power. Hence, the laser power of the optical head 1 is controlled so that the laser power is made smaller than that during recording operation on the magneto-optical disk 4 shown in FIG. 7. The laser power at this time should preferably be equal to that during reproduction operation on the magneto-optical disk 4.

Then, the optical head 1 moves to a cleaning area 48 provided on the outer circumferential side of the skip area 32, and the magnetic head 3 starts recording state, that is, cleaning operation.

By the above-mentioned operation, dust stuck to the magnetic head body 5 is wiped off and removed by the head-cleaning member 22.

After the cleaning operation, the optical head 1 and the magnetic head 3 move to the disk information area 31, and information regarding the position wherein the cleaning operation was carried out is recorded. At this time, it is desired to additionally record information regarding the number of times the cleaning operation is carried out.

As described above, in the cleaning disk and the magneto-optical disk drive apparatus in accordance with the third embodiment 3 of the preset invention, the information regarding the laser power of the optical head 1 is provided in the disk information area 44 of the cleaning disk 40; therefore, by reading the information in the disk information area 44 by using the optical head 1, the laser power of the optical head 1 can be made smaller during the cleaning operation of the cleaning disk 40 than that during recording on the ordinary magneto-optical disk 4.

Hence, the power consumption of the magneto-optical disk drive apparatus can be reduced even when the cleaning disk 40 is used.

In addition, the appropriate value of the laser power of the optical head 1 during cleaning can be read by the optical head 1 from the cleaning disk 40. As a result, the operation condition of the magneto-optical disk drive apparatus during cleaning can be set at an appropriate state depending on the cleaning disk 40. Furthermore, the laser power of the optical head 1 during cleaning can be read without providing any special structure, whereby the structure of the magneto-optical disk drive apparatus does not become complicated. Moreover, since the laser power of the optical head 1 during cleaning is read by the optical head 1, it is possible to discriminate between the cleaning disk 40 and the ordinary magneto-optical disk 4 without requiring any special configuration, whereby the structure of the magneto-optical disk drive apparatus does not become complicated for disk discrimination. Furthermore, even when the specifications of the cleaning disk 40 are modified, a countermeasure can be taken by changing the laser power of the optical head 1 during cleaning in accordance therewith; even in the magneto-optical disk drive apparatus, by setting the operation condition depending on the cleaning condition, the operation condition of the magneto-optical disk drive apparatus during cleaning can be set at an appropriate state depending on the cleaning disk 40 at all times.

In this embodiment, a recording current is supplied to the magnetic head 3; however, the current supply to the magnetic head 3 may be shut off. In this case, in addition to the above-mentioned effects, the power consumption of the magneto-optical disk drive apparatus during cleaning can be reduced further.

(Fourth Embodiment)

A fourth embodiment of the present invention will be described below referring to FIGS. 9 and 10.

Figure 9:
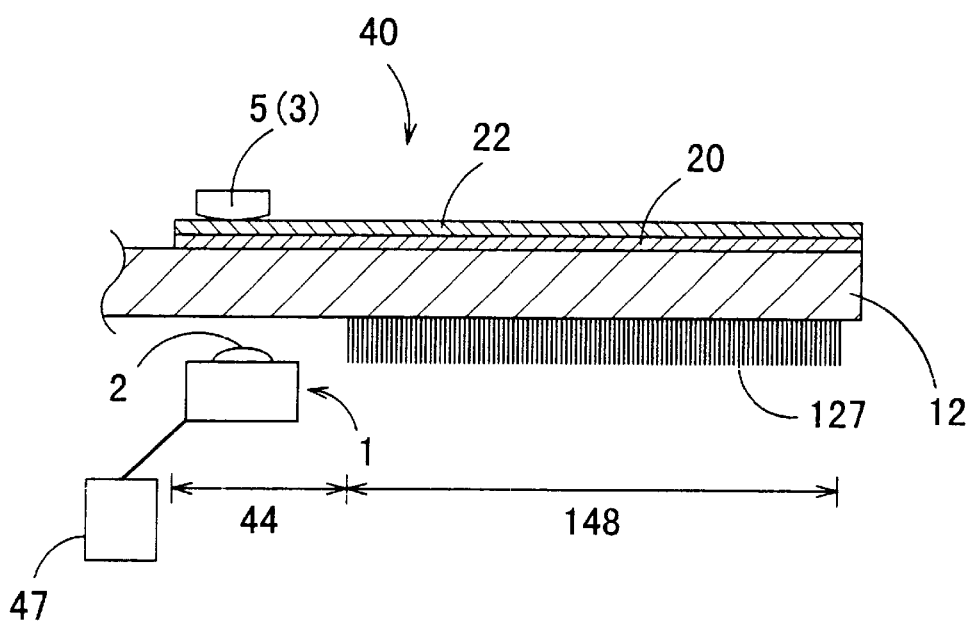
FIG. 9 is a sectional view showing the major portions of a cleaning disk and a magneto-optical disk drive apparatus in accordance with a fourth embodiment of the present invention in a state of cleaning.
Figure 10:
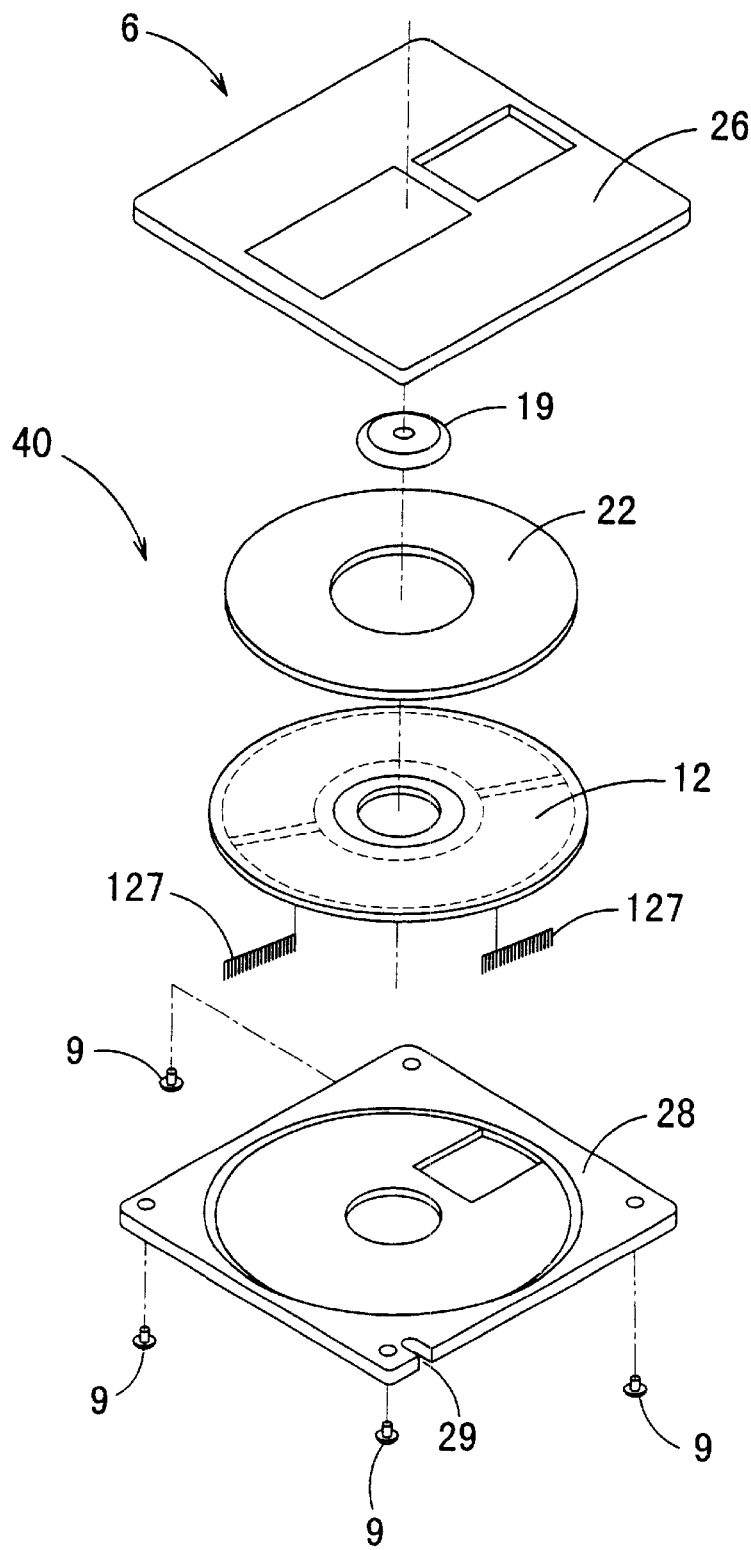
FIG. 10 is an exploded perspective view showing the cleaning disk in accordance with the fourth embodiment of the present invention.

As shown in FIGS. 9 and 10, lens-cleaning members 127 are disposed radially in the entire cleaning area of the cleaning disk 40. After the optical head 1 reads the information in the information area 44, cleaning operation is carried out in a cleaning area 148. In this case, in addition to the above-mentioned effects, the cleaning of the magnetic head 3 and the cleaning of the optical head 1 can be carried out simultaneously at all times.

Furthermore, the laser light of the optical head 1 may be turned off during the above-mentioned cleaning operation. In this case, it is desired that the spindle motor 8 should be subjected to rotation speed control by using an FG signal.

(Fifth Embodiment)

Figure 11:
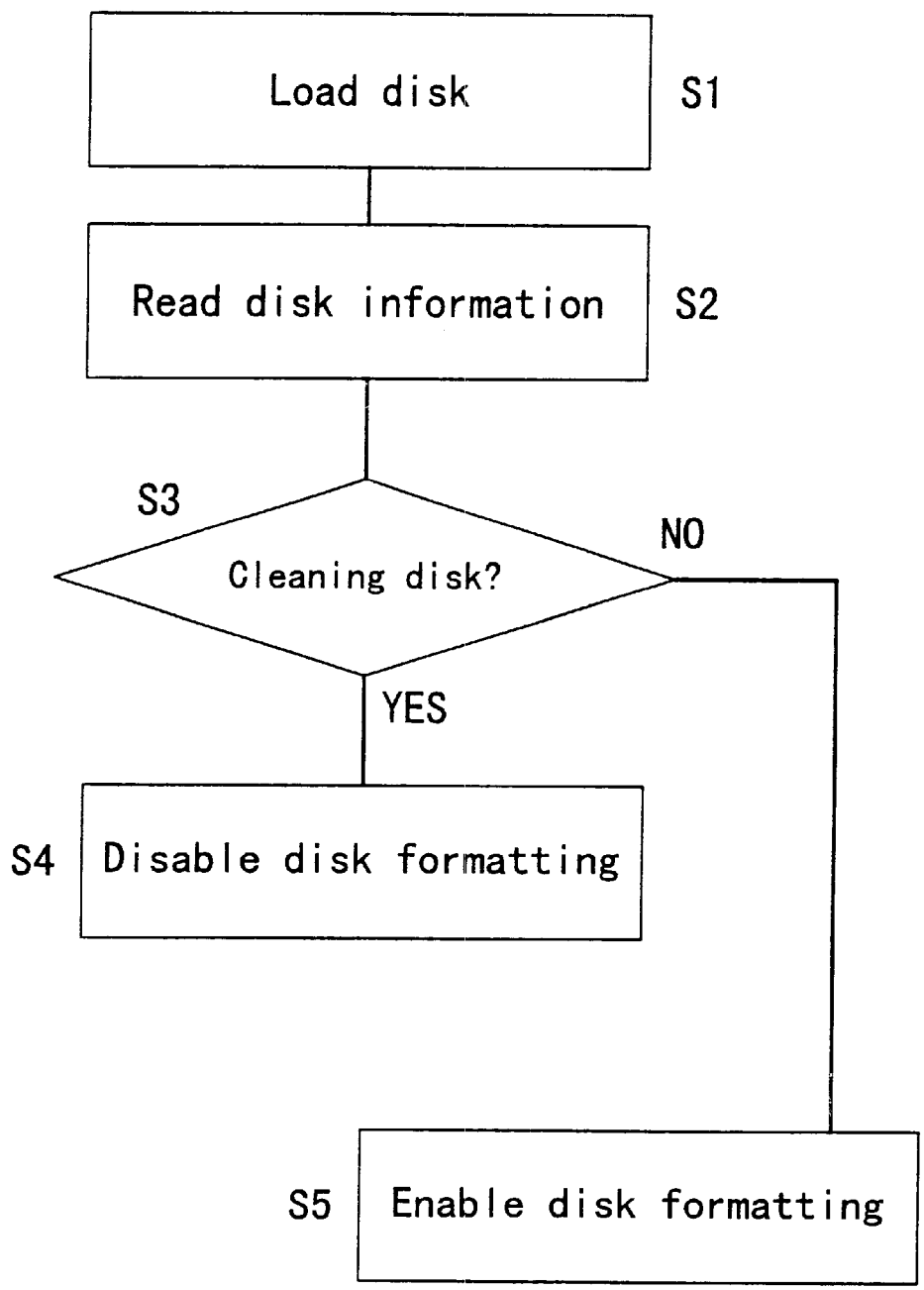
FIG. 11 is a flowchart showing the cleaning operation of a cleaning disk and a magneto-optical disk drive apparatus in accordance with a fifth embodiment of the present invention.

FIG. 11 is a flowchart showing the cleaning operation of a cleaning disk and a magneto-optical disk drive apparatus in accordance with a fifth embodiment of the present invention. In FIG. 11, step S1 is a disk loading step. Step S2 is a disk information reading step. Step S3 is a cleaning disk discrimination step. Step S4 is a disk formatting disabling step. Step S5 is a disk formatting enabling step.

Figure 12:
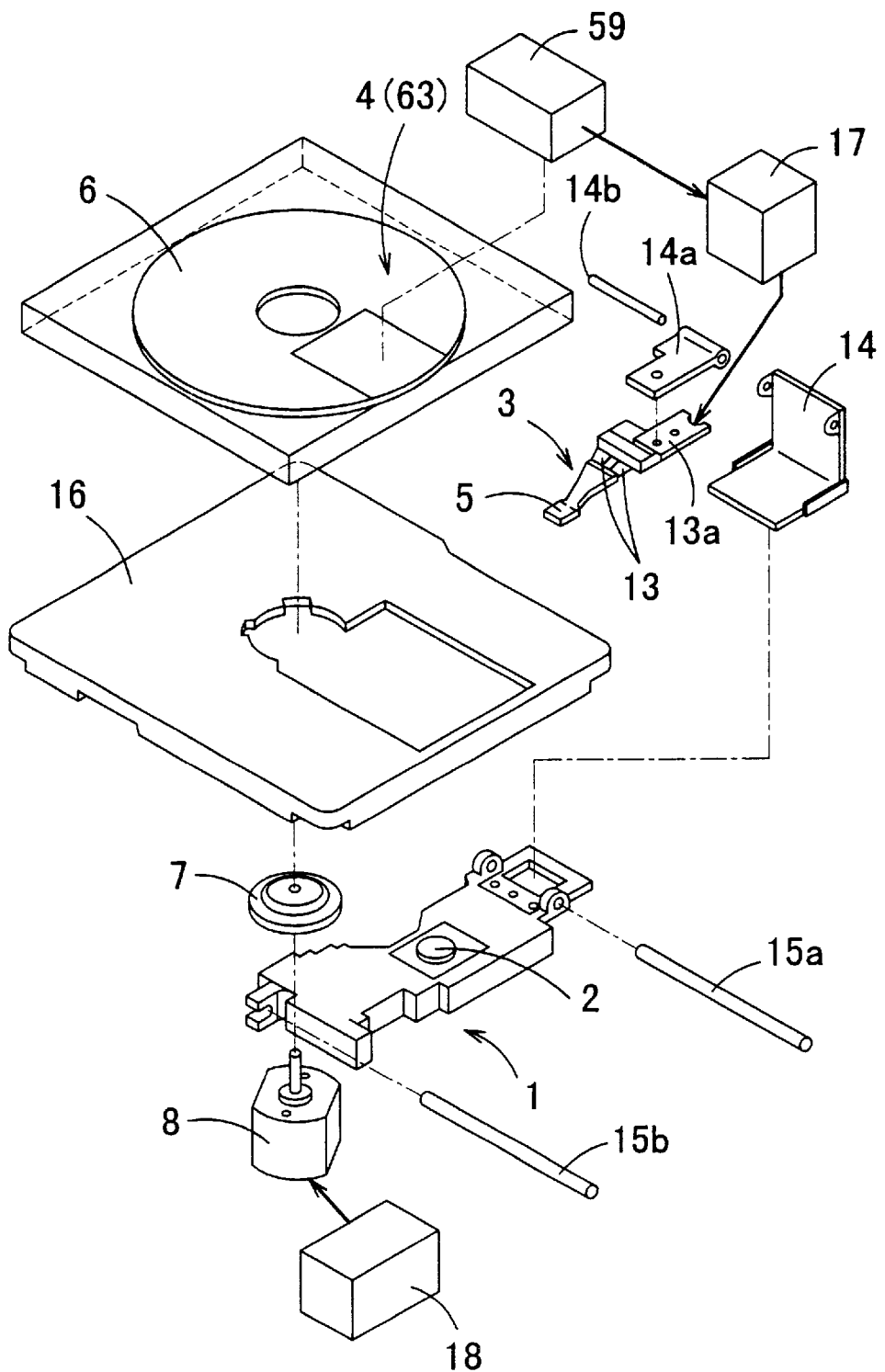
FIG. 12 is an exploded perspective view showing a recording/reproduction apparatus in accordance with a sixth embodiment of the present invention.

Referring to FIG. 12, this embodiment differs from the first, second, third and fourth embodiments in the following points: when a disk is loaded (at step S1), the optical head 1 reads the information area 44 of the cleaning disk 40 (at step S2), discrimination is made as to whether the disk is a cleaning disk or not according to the read information (at step S3), disk formatting is disabled when the disk is recognized as a cleaning disk (at step S4), and disk formatting is enabled in the other case (at step S5).

Next, the operation of this embodiment will be described.

When the cleaning disk 40 shown in FIG. 9 is loaded into the magneto-optical disk drive apparatus, the optical head 1 reads information in the information area 44.

In the information area 44 of the cleaning disk 40, control information for magneto-optical disk drive apparatus, such as magnetic head drive current control information, spindle motor rotation control information and laser power control information for the optical head 1 as well as information regarding the number of times the cleaning disk is used and the usage area thereof are written simultaneously in advance. The optical head 1 reads the information, and the magneto-optical disk drive apparatus recognizes that the loaded disk is a cleaning disk.

Then, the magneto-optical disk drive apparatus goes into a mode wherein disk-formatting operation for formatting the information area 44 is disabled.

Pits for the above-mentioned magneto-optical disk control information may be formed in the disk in advance. However, the information regarding the usage state of the cleaning disk, such as the number of times the cleaning disk is used and the usage area thereof, is required to be written by the magneto-optical disk drive apparatus; by disabling disk formatting, the user is prevented from erasing the above-mentioned information regarding the usage state of the cleaning disk by mistake.

Since the cleaning operation is similar to that in the first, second and third embodiments, its explanation is omitted here.

As described above, in the cleaning disk and the magneto-optical disk drive apparatus in accordance with the third embodiment 5 of the preset invention, the information in the disk information area 44 is read by the optical head 1, and disk formatting is disabled when the magneto-optical disk drive apparatus discriminates and recognizes a cleaning disk.

Hence, the user is prevented from erasing the information regarding the usage state of the cleaning disk by mistake.

Other effects of this embodiment are similar to those of the preceding embodiments.

Although disk formatting is disabled when the magneto-optical disk drive apparatus recognizes the cleaning disk in this embodiment, in the case when all the cleaning areas are used, it is preferable that disk formatting should be enabled.

In this case, in addition to the above-mentioned effects, the same cleaning disk can be used a plurality of times.

Furthermore, it is desirable that an area wherein the number of times the cleaning disk is used is recorded should be provided in an area other than the information area 44 so that the information regarding the number of times the cleaning disk is used is not erased.

In this case, in addition to the above-mentioned effects, it is sure that the number of times the cleaning disk is used can be grasped.

Furthermore, as a result of reading of the above-mentioned number of times by the magneto-optical disk drive apparatus, if the number is a certain value or more, it is desirable that the use of the above-mentioned cleaning disk should be disabled.

In this case, in addition to the above-mentioned effects, it is possible to prevent the use of a cleaning disk whose service life has ended, and the reliability of the devices is improved.

In the above-mentioned embodiment, a configuration for disabling disk formatting is described; however, it may be possible that at least writing or erasing of the information in the index area is disabled during cleaning. Conditions for rewriting or erasing the information in the index area can be considered just as in the case of the above-mentioned disk formatting. With this configuration, in the case when information regarding the usable remaining area of the cleaning disk and information regarding the number of usage times thereof are written in the index area, the information regarding the usable remaining area of the cleaning disk and the information regarding the number of usage times thereof are prevented from being erased or changed by mistake.

(Sixth Embodiment)

Figure 13:
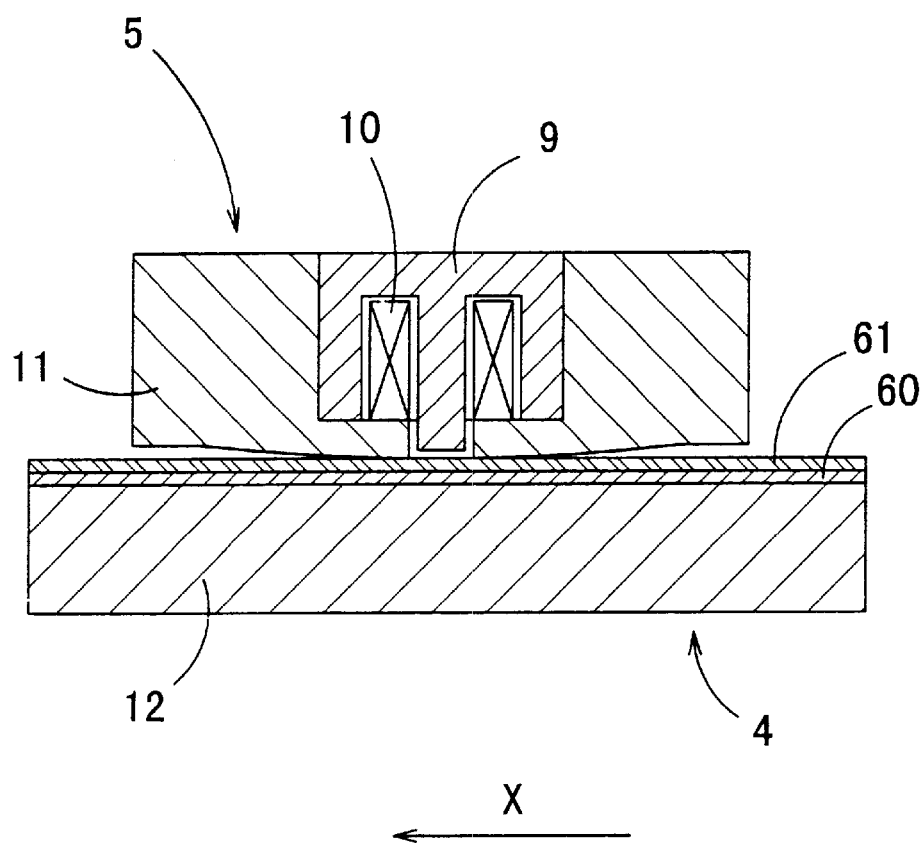
FIG. 13 is a side sectional view showing the major portions of a magnetic head and a magneto-optical disk during recording operation in the recording/reproduction apparatus in accordance with the sixth embodiment of the present invention.
Figure 14:
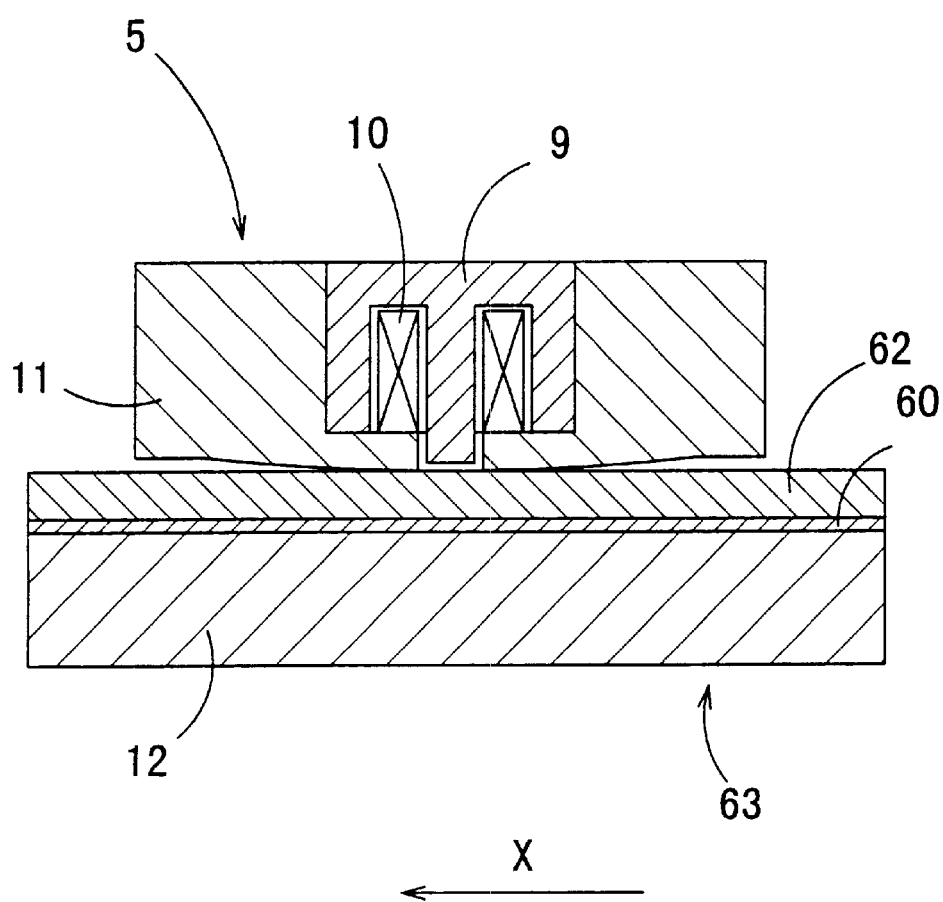
FIG. 14 is a side sectional view showing the major portions of the magnetic head and a magnetic head cleaning disk during magnetic head cleaning operation in the recording/reproduction apparatus in accordance with the sixth embodiment of the present invention.
Figure 15:
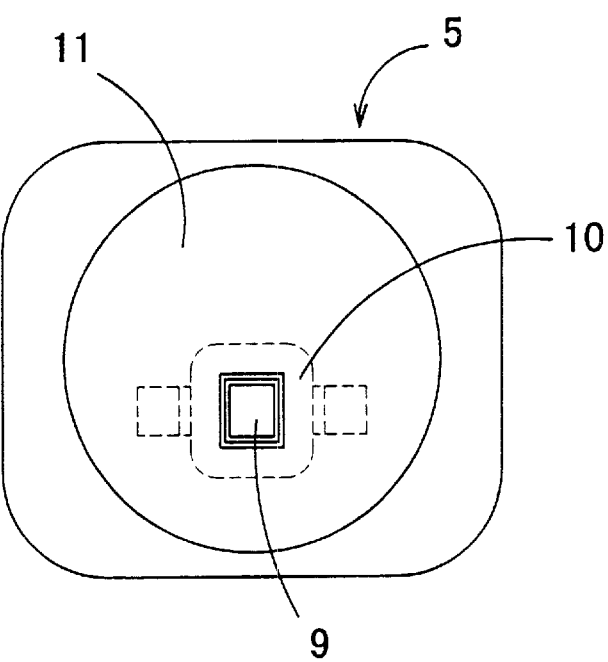
FIG. 15 is a magnified view showing the major portions of the sliding face of the magnetic head in the recording/reproduction apparatus in accordance with the sixth embodiment of the present invention.
Figure 16:
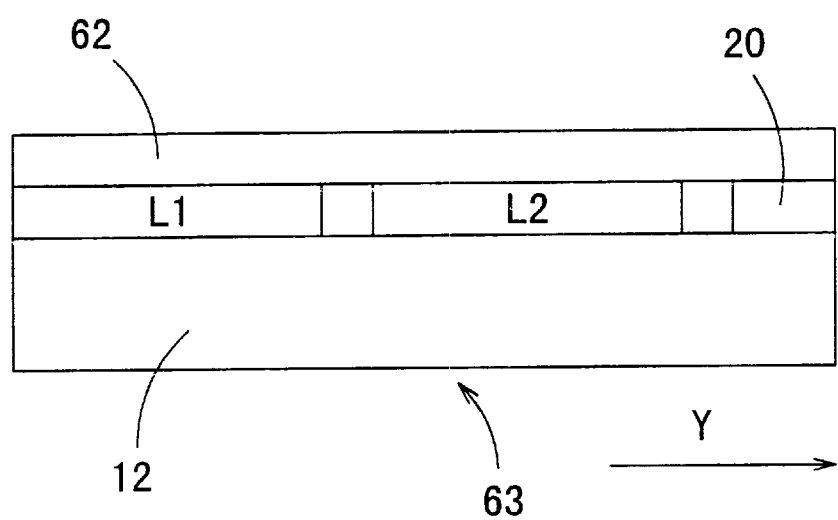
FIG. 16 is an explanatory view showing the operation of recording on the magnetic head cleaning disk in the recording/reproduction apparatus in accordance with the sixth embodiment of the present invention.

FIG. 12 is an exploded perspective view showing a recording/reproduction apparatus in accordance with a sixth embodiment of the present invention. FIG. 13 is a side sectional view showing the major portions of a magnetic head and a magneto-optical disk (ordinary recording/reproduction disk) during ordinary recording operation. FIG. 14 is a side sectional view showing the major portions of a magnetic head cleaning disk and the magnetic head during magnetic head cleaning operation. FIG. 15 is a magnified view showing the major portions of the magnetic head. FIG. 16 is an explanatory view showing the operation of recording on the magnetic head cleaning disk.

In FIGS. 12 to 16, the optical head 1 is provided with the objective lens 2 for gathering and applying laser light to the magneto-optical disk 4 or a magnetic head cleaning disk 63. In the magnetic head 3, the head body 5 making sliding contact with the magneto-optical disk 4 and supplying a modulated magnetic field thereto is supported at one end of the suspension 13. The suspension 13 is made of a thin spring material, such as SUS304 or BeCu, to make the head body 5 sliding contact with the magneto-optical disk 4 at all times even when surface wobbling occurs on the magneto-optical disk 4. The other end of the suspension 13 is held by the fixed portion 13a, the fixed portion 13a is secured to the joint portion 14a, and the joint portion 14a is rotatably held by the connection portion 14 via the shaft 14b. Furthermore, the connection portion 14 is connected to the optical head 1.

The magnetic head body 5 comprises the magnetic core 9, the coil 10 and the slider 11. The slider 11 is made of a resin having a high sliding performance, such as polyphenylene sulfide or liquid crystal polymer, and makes sliding contact with the magneto-optical disk 4 for ordinary recording/reproduction or the magnetic head cleaning disk 63. This slider 11 is formed so as to be integrated with the suspension 13. As shown in FIG. 13, the magnetic core 9 has an E-shaped form, the open end of which faces toward the sliding face of the slider 11. The coil 10 is wound around and secured to the center pole of the magnetic core 9. Furthermore, the coil 10 is electrically joined to the suspension 13 having a feeding function, and generates a modulated magnetic field when a modulated current is supplied from the magnetic head drive circuit 17.

The transfer shafts 15a and 15b are inserted into the optical head 1 and secured to the base 16. The spindle motor 8 is secured to the base 16. The turntable 7 is secured to the end of the rotation shaft of the spindle motor 8 to hold the magneto-optical disk 4 for ordinary recording/reproduction or the magnetic head cleaning disk 63. Furthermore, the motor drive circuit 18 rotates and drives the spindle motor 8, thereby rotating the magneto-optical disk 4 or the magnetic head cleaning disk 63. The magneto-optical disk 4 or the magnetic head cleaning disk 63 is housed in the cartridge 6.

When the cartridge 6 is loaded into the recording/reproduction apparatus, a shutter (not shown) provided for the cartridge 6 opens, and recording/reproduction operation by the optical head 1 and the magnetic head 3 can be carried out.

A reflection sensor 59 detects the reflectivity of the face of the magneto-optical disk 4 or the magnetic head cleaning disk 63 making sliding contact with the magnetic head 3, thereby functioning as discrimination means for discriminating as to whether the disk medium is the magneto-optical disk 4 or the magnetic head cleaning disk 63; the sensor comprises an LED light-emitting portion and a light-receiving device for example. Light is then applied from the LED light-emitting portion to the sliding face of the magneto-optical disk 4 making sliding contact with the magnetic head through the shutter window of the cartridge 6, and its reflected light is received by the light-receiving device, whereby the magnitude of the level of the reflected light can be determined.

Next, the structure of the disk medium will be described.

First, the magneto-optical disk 4 for ordinary recording/reproduction will be described referring to FIG. 13. The disk substrate 12 is formed of a resin, such as polycarbonate. A recording/reproduction layer (information layer) 60 is made of a magnetic film capable of vertical magnetization and formed on the disk substrate 12 by the sputtering method or the like. A lubrication film 61 is made of a silicone-based lubricant for example, and its thickness is for example generally 10 μm to 20 μm in the case of an MD. In FIG. 13, reference code X designates the movement direction of the disk.

Next, the magnetic head cleaning disk 63 will be described referring to FIG. 14. The disk substrate 12 is made of a resin, such as polycarbonate. The recording/reproduction layer 60 is made of a magnetic film capable of vertical magnetization and formed on the disk substrate 12 by the sputtering method or the like. A cleaning layer 62 is formed of woven cloth made of animal fiber, plant fiber, synthetic fiber, chemical fiber, etc. or nonwoven cloth. This cleaning layer 62 is secured to the disk substrate 12 with an adhesive for example, and its thickness is for example about 0.2 mm to 0.4 mm in the case of an MD. Furthermore, the coefficient of friction of the cleaning layer 62 is about two to four times as high as that of the lubrication film 61. In FIG. 14, reference code X designates the movement direction of the disk.

Next, the operations of the above-mentioned recording/reproduction apparatus will be described.

When recording is carried out on the magneto-optical disk 4 or the magnetic head cleaning disk 63 shown in FIGS. 12, 13 and 14, while the above-mentioned magneto-optical disk 4 or magnetic head cleaning disk 63 is rotated by the spindle motor 8, the optical head 1 emits a laser spot to one side of the recording/reproduction layer 60 to heat the recording area of the recording/reproduction layer 60 to Curie temperature or more. At the same time, a current modulated by an information signal is supplied from the magnetic head drive circuit 17 to the coil 10 via the suspension 13, whereby a vertical magnetic field being directed from the end face of the central magnetic pole of the magnetic core 9 to the recording/reproduction layer 60 is generated, and an N or S magnetic field is thus applied. By the above-mentioned operation, recording is carried out.

At this time, the slider 11 makes sliding contact with the lubrication film 61 or the cleaning layer 62.

One cleaning operation of the magnetic head 3 becomes one recording operation of about 10 to 30 seconds in the case of an MD for example. As shown in FIG. 16, each time a cleaning operation is carried out, the operation is recorded as a piece of music; when a cleaning operation is carried out next time, the recording operation is performed and recorded as the next piece of music. In other words, the slider 11 does not make sliding contact with an area on the cleaning layer 62 again, with which the slider 11 made sliding contact. This prevents dust and the like stuck to the cleaning layer from being stuck to the slider 11 again. In FIG. 16, reference code Y designates a radial direction.

In the above-mentioned head cleaning operation, when the magnetic head cleaning disk 63 is loaded into the recording/reproduction apparatus, the light-receiving amount of the reflection sensor 59 reduces since the cleaning layer 62 is relatively apt to scatter and absorb light. Because of the reduction in the light-receiving amount, the reflection sensor 59 discriminates and recognizes that the disk medium is the magnetic head cleaning disk 63; when the light-receiving amount is large, the sensor discriminates and recognizes that the disk medium is the ordinary magneto-optical disk 4.

When the disk medium is the magnetic head cleaning disk 63 on the basis of the discrimination result by the reflection sensor 59, the modulated current to be supplied from the magnetic head drive circuit 17 to the magnetic head 3 is made larger than that during recording operation on the ordinary magneto-optical disk 4. Conversely, when recording is carried out on the ordinary magneto-optical disk 4, the modulated current to be supplied to the magnetic head 3 is made smaller than that during recording operation on the magnetic head cleaning disk 63.

By the above-mentioned operation, dust stuck to the slider 11 is wiped off and removed, and recording operation on the recording/reproduction layer 60 is carried out.

As described above, in the recording/reproduction apparatus in accordance with the sixth embodiment of the present invention, the reflection sensor 59 is provided to discriminate and recognize the type of disk medium, whereby the current value to be supplied from the magnetic head drive circuit 17 to the magnetic head 3 can be made different depending on whether recording operation is carried out on the magnetic head cleaning disk 63 or on the ordinary magneto-optical disk 4. In other words, the modulated current can be made large when recording operation is carried out on the magnetic head cleaning disk 63 during which the spacing between the magnetic head 3 and the recording/reproduction layer 60 is large, and the current can made small when recording operation is carried out on the ordinary magneto-optical disk 4 during which the spacing is small. As a result, power consumption and electromagnetic noise of the recording/reproduction apparatus can be reduced.

(Seventh Embodiment)

Figure 17:
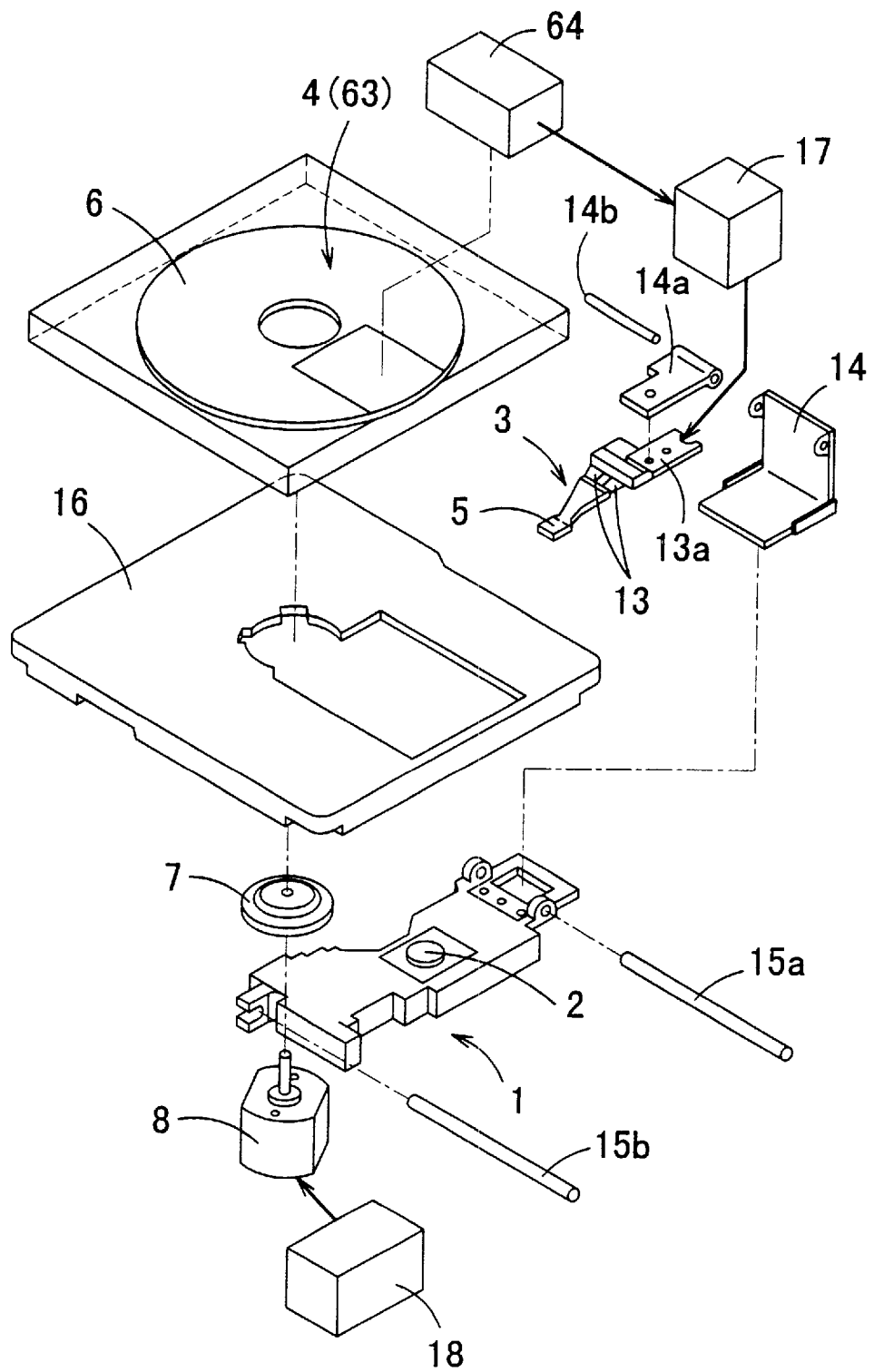
FIG. 17 is an exploded perspective view showing a recording/reproduction apparatus in accordance with a seventh embodiment of the present invention.

FIG. 17 is an exploded perspective view showing a recording/reproduction apparatus in accordance with a seventh embodiment of the present invention.

This embodiment differs from the sixth embodiment in that a CCD sensor 64 is used instead of the reflection sensor 59 as discrimination means to detect the color of the face of the disk medium making sliding contact with the magnetic head and to discriminate as to whether the disk medium is the magnetic head cleaning disk 63 or the ordinary magneto-optical disk 4.

Even in this embodiment, effects similar to those of the sixth embodiment can be obtained.

(Eighth Embodiment)

Figure 18:
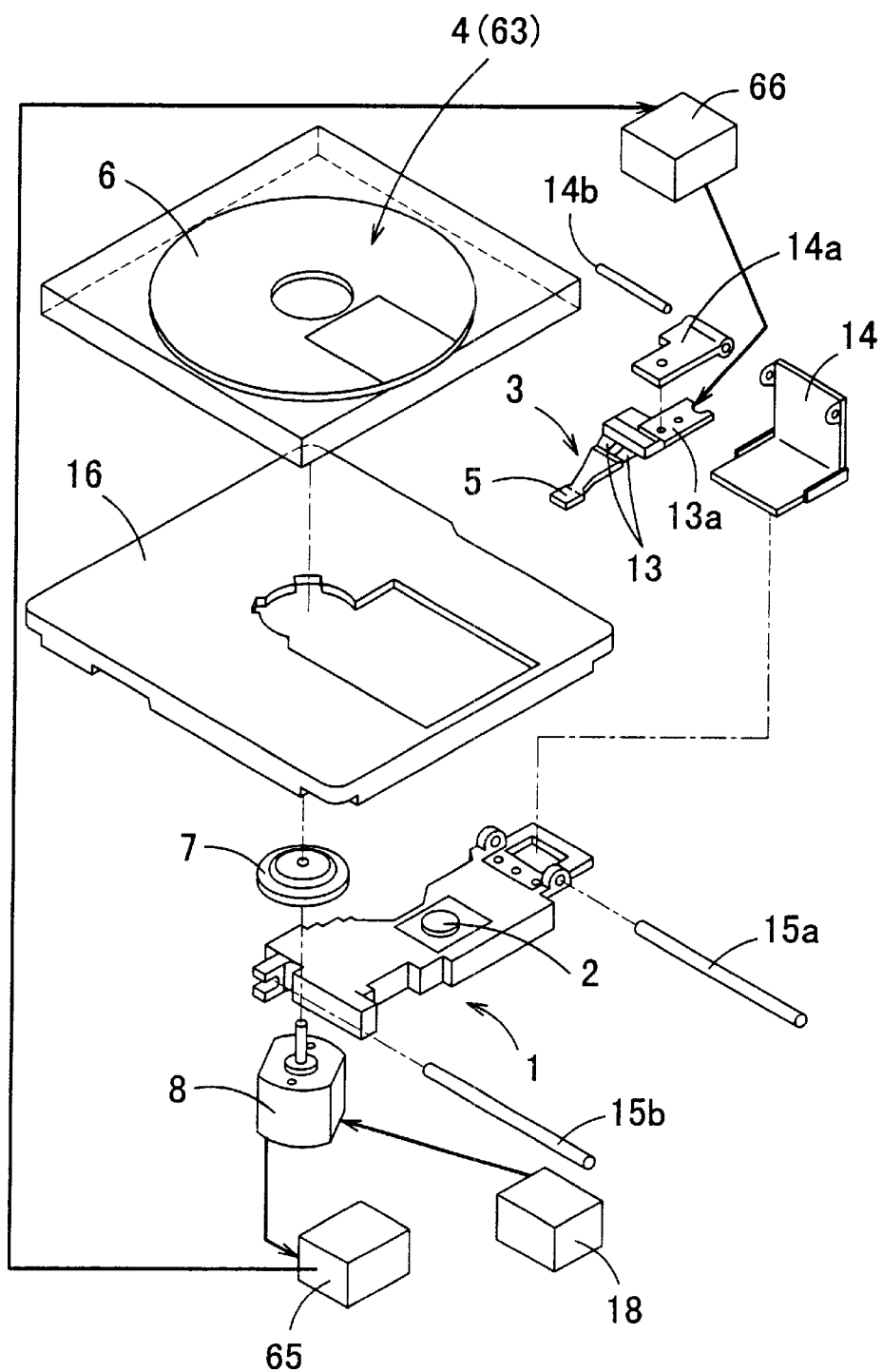
FIG. 18 is an exploded perspective view showing a recording/reproduction apparatus in accordance with an eighth embodiment of the present invention.

FIG. 18 is an exploded perspective view showing a recording/reproduction apparatus in accordance with an eighth embodiment of the present invention.

The recording/reproduction apparatus in accordance with this embodiment differs from those in accordance with the sixth and seventh embodiments in that, without detecting the reflectivity or color of the face of the disk medium making sliding contact with the magnetic head, as discrimination means, a sliding load at the time when the magnetic head makes sliding contact with the disk medium is detected to discriminate as to whether the disk medium is the magnetic head cleaning disk or the ordinary magneto-optical disk.

More specifically, instead of the reflection sensor 59 or the CCD sensor 64, a motor drive current detection circuit 65 is used to detect the drive current of the spindle motor 8 for rotating the disk medium as the sliding load at the time when the magnetic head makes sliding contact with the disk medium and to discriminate and recognize that the disk medium is the magnetic head cleaning disk.

In FIG. 18, the motor drive current detection circuit 65 detects the drive current of the spindle motor 8 as described above, and determines that the disk medium is the magnetic head cleaning disk when the drive current is large and that the disk medium is the ordinary magneto-optical disk when the drive current is small. A magnetic head drive circuit 66 is used to supply the modulated current to the magnetic head 3.

Since the coefficient of friction of the cleaning layer 62 of the magnetic head cleaning disk 63 is larger than that of the lubrication film 61 of the magneto-optical disk 4 as described above, when the magnetic head cleaning disk 63 is loaded into the recording/reproduction apparatus and when the magnetic head 3 starts making sliding contact with the cleaning layer 62, a rotation load to the spindle motor 8 becomes large, and its drive current also becomes large.

Hence, the type of the disk medium is discriminated and recognized by detecting the drive current of the spindle motor 8 by using the motor drive current detection circuit 65 as shown in FIG. 18; only when the magnetic head cleaning disk 63 is used during which the spacing between the magnetic core 9 and the recording/reproduction layer 60 is large, the modulated current supplied from the magnetic head drive circuit 17 to the magnetic head 3 is increased.

As described above, in the recording/reproduction apparatus in accordance with the eighth embodiment, in addition to the effects of the sixth embodiment, the motor drive current detection circuit 65 is provided to detect the drive current of the spindle motor 8 as the sliding load, whereby the magnetic head cleaning disk 63 can be discriminated from the ordinary magneto-optical disk 4 without adding any special sensor, the number of components can be reduced, and the price of the recording/reproduction apparatus can be lowered.

(Ninth Embodiment)

Figure 19:
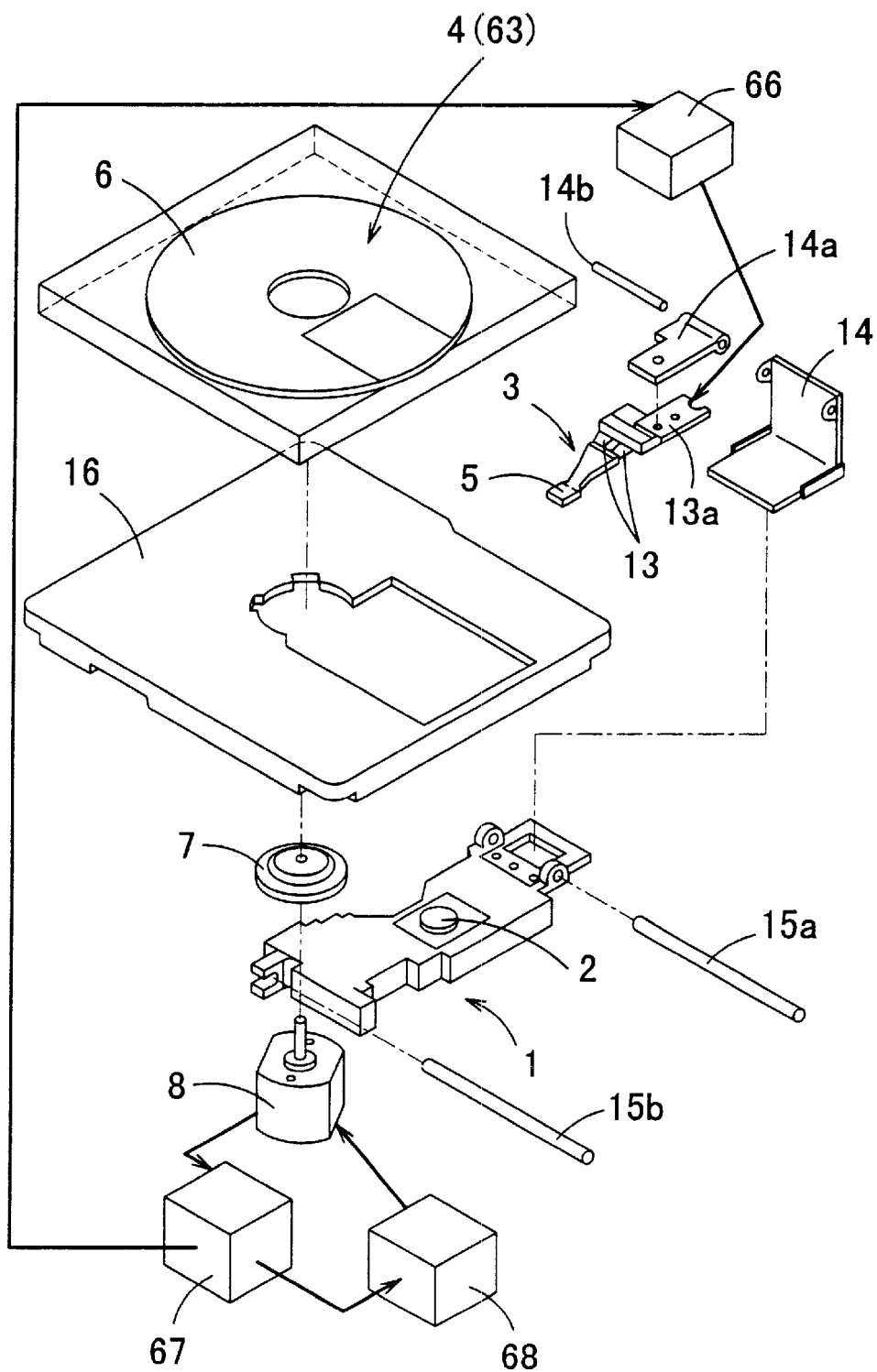
FIG. 19 is an exploded perspective view showing a recording/reproduction apparatus in accordance with a ninth embodiment of the present invention.
Figure 20:
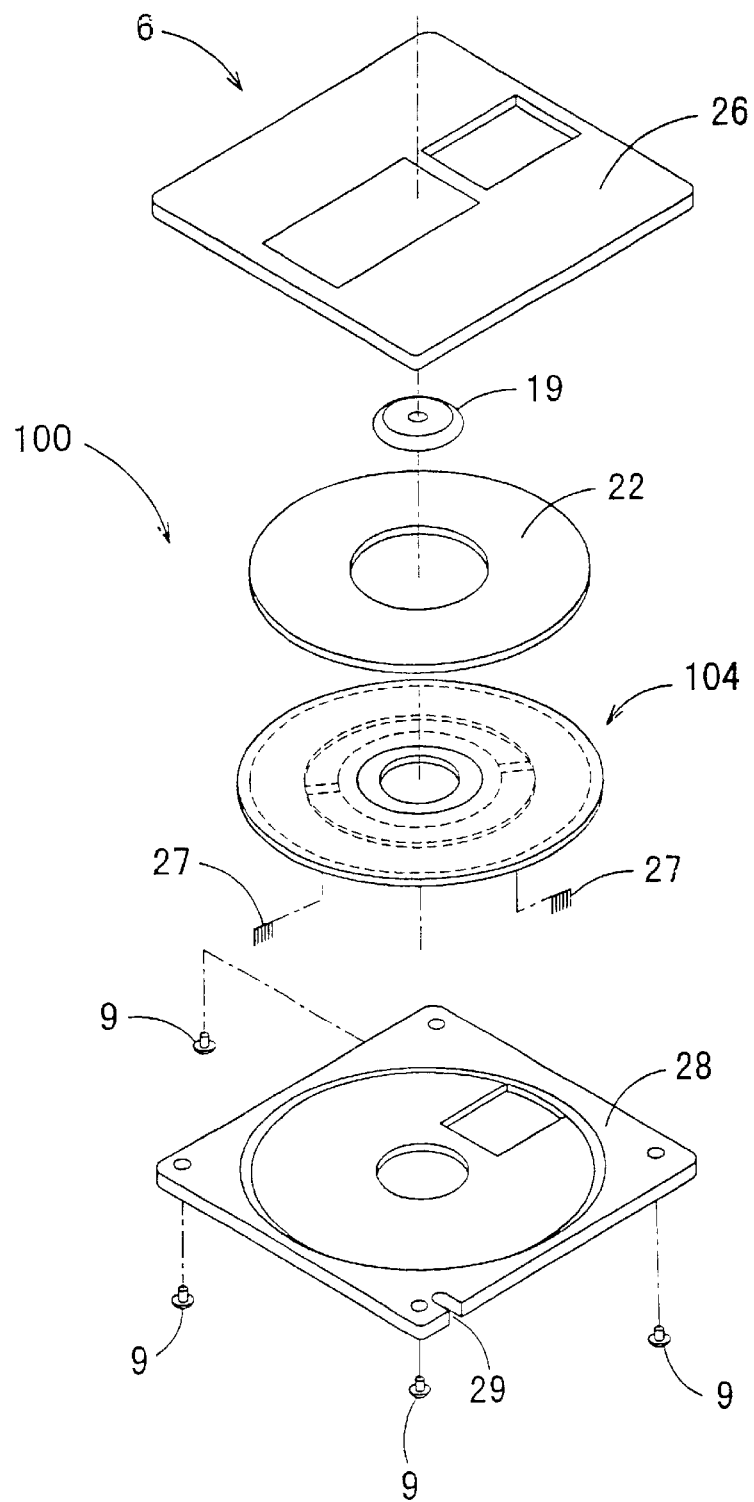
FIG. 20 is an exploded perspective view showing the cleaning disk of the conventional recording/reproduction apparatus.

FIG. 19 is an exploded perspective view showing a recording/reproduction apparatus in accordance with a ninth embodiment of the present invention.

The recording/reproduction apparatus in accordance with the ninth embodiment differs from that in accordance with the eighth embodiment in that the information regarding the disk discriminated and recognized by a motor drive current detection circuit 67 is transmitted to a motor drive circuit 68 as well as the magnetic head drive circuit 66.

In FIG. 19, the motor drive current detection circuit 67 detects the drive current of the spindle motor 8 just like the motor drive current detection circuit 65. The motor drive circuit 68 supplies the drive current to the spindle motor 8 and has a function of controlling the rotation speed of the spindle motor 8 depending on the discrimination and recognition result by the motor drive current detection circuit 67. More specifically, when the disk medium is the magnetic head cleaning disk 63, the rotation speed is lowered than that when the disk medium is the ordinary magneto-optical disk 4.

Since the coefficient of friction of the cleaning layer 62 of the magnetic head cleaning disk 63 is larger than that of the lubrication film 61 of the magneto-optical disk 4 as described above, when the magnetic head cleaning disk 63 is loaded into the recording/reproduction apparatus and when the magnetic head 3 starts making sliding contact with the cleaning layer 62, a rotation load to the spindle motor 8 becomes large, and the drive current also becomes large.

Hence, the type of the disk medium is discriminated and recognized by the motor drive current detection circuit 67; when the magnetic head cleaning disk 63 is used, the motor drive circuit 68 carries out control to rotate the spindle motor 8 at low speed. Therefore, wear of the slider 11 owing to the sliding of the cleaning layer 62 having a large coefficient of friction can be reduced.

As described above, in the recording/reproduction apparatus in accordance with the ninth embodiment, in addition to the effects of the eighth embodiment, the motor drive current detection circuit 67 discriminates and recognizes the type of disk medium; when the magnetic head cleaning disk 63 is used, the spindle motor 8 is rotated at low speed, whereby wear of the slider 11 can be reduced, and the reliability of the recording/reproduction apparatus can be improved.

The discrimination output of the reflection sensor 59 in accordance with the sixth embodiment or the CCD sensor 64 in accordance with the seventh embodiment may be used to control the motor drive circuit just as in the case of the ninth embodiment so that the spindle motor 8 is rotated at low speed when the magnetic head cleaning disk 63 is used. In this case, just as in the case of the ninth embodiment, wear of the slider 11 owing to the sliding of the cleaning layer 62 having a large coefficient of friction can be reduced, and the reliability of the recording/reproduction apparatus can be improved.

Furthermore, in the above-mentioned ninth embodiment, it is possible to consider an embodiment wherein the control of the magnetic head drive circuit 66 by using the discrimination output of the motor drive current detection circuit 67 is omitted. In this case, it is possible to obtain the effect of reducing wear of the slider 11 and improving the reliability of the recording/reproduction apparatus, although the effects of reducing power consumption and electromagnetic noise of the recording/reproduction apparatus cannot be obtained.

Even a recording/reproduction apparatus based on a magnetic recording/reproduction system, typified by an FDD, can also be accomplished by eliminating the optical head 1 from the above-mentioned sixth to ninth embodiments; hence, its explanation is omitted here.

What is claimed is:

1. A cleaning disk comprising a magneto-optical disk having an information layer, and a head-cleaning member, provided on said magneto-optical disk, for cleaning a magnetic head of a magneto-optical disk drive apparatus, wherein information regarding a magnetic head cleaning condition for setting an operation condition of said magneto-optical disk drive apparatus during cleaning of said magnetic head has been recorded in advance on an information layer of said magneto-optical disk.

2. A cleaning disk in accordance with claim 1, wherein said cleaning condition is a recording condition during cleaning of said magnetic head.

3. A cleaning disk in accordance with claim 1, wherein said cleaning condition is a rotation speed of said magneto-optical disk during cleaning.

4. A cleaning disk in accordance with claim 1, wherein said cleaning condition is a laser power of the optical head during cleaning.

5. A cleaning disk in accordance with claim 1, wherein information regarding said cleaning condition is recorded in an index area on the information layer of said magneto-optical disk.

6. A magneto-optical disk drive apparatus having a magnetic head and an optical head, wherein information regarding a cleaning condition is read from a cleaning disk comprising a magneto-optical disk and a magnetic head-cleaning member provided thereon, on an information layer of which information regarding said cleaning condition is recorded, and an operation condition during cleaning is controlled on the basis of said cleaning condition.

7. A magneto-optical disk drive apparatus in accordance with claim 6, wherein said cleaning condition is a drive current of said magnetic head during cleaning, said operation condition is said drive current of said magnetic head, and said drive current of said magnetic head is made larger during cleaning than that during ordinary recording.

8. A magneto-optical disk drive apparatus in accordance with claim 6, wherein said cleaning condition is a disk rotation speed during cleaning, said operation condition is said disk rotation speed, and said disk rotation speed during cleaning is made lower than that during ordinary recording or reproduction.

9. A magneto-optical disk drive apparatus in accordance with claim 6, wherein said cleaning condition is a laser power of said optical head during cleaning, said operation condition is said laser power of said optical head, and said laser power of said optical head during cleaning is made lower than that during ordinary recording.

10. A magneto-optical disk drive apparatus in accordance with claim 6, wherein a laser power of said optical head is used as the laser power for reproduction during cleaning, and cleaning is carried out while said magnetic head is made sliding contact with said cleaning disk, and then information designating an area of said cleaning disk used during said cleaning is recorded in an index area on the information layer of said cleaning disk.

11. A magneto-optical disk drive apparatus in accordance with claim 6, wherein disk formatting is disabled during cleaning.

12. A magneto-optical disk drive apparatus in accordance with claim 6, wherein at least a rewriting or erasing of the information in an index area of said information layer is disabled during cleaning.

* * * * *